US006241565B1

(12) United States Patent
Doroftel

(10) Patent No.: US 6,241,565 B1
(45) Date of Patent: Jun. 5, 2001

(54) HELICAL DRIVE HUMAN POWERED BOAT

(75) Inventor: Mighel Doroftel, Calgary (CA)

(73) Assignee: Helixsphere Technologies, Inc., Calgary (CA)

( * ) Notice: Subject to any disclaimer, the term of this patent is extended or adjusted under 35 U.S.C. 154(b) by 0 days.

(21) Appl. No.: 08/922,330

(22) Filed: Sep. 3, 1997

Related U.S. Application Data

(63) Continuation-in-part of application No. 08/771,982, filed on Dec. 23, 1996.
(60) Provisional application No. 60/050,275, filed on Jun. 20, 1997, provisional application No. 60/049,102, filed on Jun. 9, 1997, provisional application No. 60/049,101, filed on Jun. 9, 1997, provisional application No. 60/049,509, filed on Jun. 9, 1997, provisional application No. 60/049,507, filed on Jun. 9, 1997, provisional application No. 60/045,326, filed on May 1, 1997, provisional application No. 60/044,462, filed on Apr. 17, 1997, provisional application No. 60/044,137, filed on Apr. 16, 1997, provisional application No. 60/043,762, filed on Apr. 8, 1997, provisional application No. 60/042,964, filed on Apr. 7, 1997, provisional application No. 60/047,963, filed on Apr. 7, 1997, and provisional application No. 60/041,924, filed on Apr. 7, 1997.

(51) Int. Cl.[7] .................................................. B63H 16/00
(52) U.S. Cl. ................................................. 440/21; 440/25
(58) Field of Search ............................ 440/25, 1, 2, 26, 440/27, 28, 29, 53, 75, 113, 21

(56) References Cited

U.S. PATENT DOCUMENTS

| Re. 33,058 | 9/1989 | Steuer et al. ........................ 74/750 B |
| 51,815 | 1/1866 | Eads ........................................ 74/127 |
| 87,630 | 3/1869 | Burns .................................... 200/252 |
| 381,160 | 4/1888 | Moon ...................................... 74/127 |
| 395,099 | 12/1888 | Willett ..................................... 74/127 |
| 398,899 | 3/1889 | Martignoni ............................. 74/127 |
| 408,745 | 8/1889 | Pool ........................................ 74/127 |
| 443,347 | 12/1890 | Allen ....................................... 440/21 |
| 450,997 | 4/1891 | Dies ....................................... 74/127 |
| 465,099 | 12/1891 | Rice, Jr. ................................. 74/127 |
| 465,100 | 12/1891 | Rice, Jr. ................................. 74/127 |
| 549,397 | 11/1895 | Savorgnan ........................... 280/253 |
| 552,910 | 1/1896 | Kimball .................................. 74/127 |
| 555,242 | 2/1896 | Hallenbeck ............................. 74/31 |
| 578,269 | 3/1897 | Savorgnan ............................... 74/54 |
| 579,218 | 3/1897 | Bremer et al. ......................... 74/127 |
| 597,621 | 1/1898 | Russell .................................. 74/127 |
| 617,762 | 1/1899 | McCollum ............................. 74/127 |
| 618,330 | 1/1899 | Campbell ............................... 74/127 |
| 622,780 | 4/1899 | Olson et al. ........................... 74/127 |
| 641,906 | 1/1900 | Trabue et al. ............................ 43/20 |
| 651,244 | 6/1900 | Forbes .................................. 280/223 |
| 651,316 | 6/1900 | Smith ...................................... 74/44 |
| 690,835 | 1/1902 | Clayland ................................ 74/127 |
| 713,633 | 11/1902 | Hall ....................................... 242/255 |
| 771,864 | 10/1904 | Eager ..................................... 74/127 |

(List continued on next page.)

FOREIGN PATENT DOCUMENTS

| 631286 | 9/1927 | (FR) . |
| 6855 | of 1891 | (GB) . |
| 20936 | of 1896 | (GB) . |

Primary Examiner—Stephen Avila
(74) Attorney, Agent, or Firm—Jeffrey Weiss; Jeffrey D. Moy; Weiss & Moy, P.C.

(57) ABSTRACT

A boat having a helical drive mechanism. The helical drive mechanism includes a slider engaged with a twisted screw or a cylinder having a helical slot or groove. The helical drive mechanism is connected to a force input shaft which is arranged within the boat so that it can be driven by the user's feet or hands. The user drives the force input shaft in a rectilinear motion to force the twisted screw or cylinder of the helical drive mechanism to rotate. This force is ultimately transferred to a propeller to move the boat.

92 Claims, 15 Drawing Sheets

U.S. PATENT DOCUMENTS

| | | | |
|---|---|---|---|
| 829,279 | 8/1906 | Mears | 74/127 |
| 850,953 | 4/1907 | McDowell | 74/127 |
| 882,845 | 3/1908 | Sachs | 475/300 |
| 931,656 | 8/1909 | Sangster | 475/289 |
| 944,064 | 12/1909 | West | 74/127 |
| 994,359 | 6/1911 | Archer | 192/6 R |
| 1,005,690 | 10/1911 | Carlson | 74/57 |
| 1,019,637 | 3/1912 | Hays | 74/127 |
| 1,025,989 * | 5/1912 | Master | 440/25 |
| 1,047,509 | 12/1912 | Dziak | 74/127 |
| 1,072,701 | 9/1913 | Collins | 74/127 |
| 1,076,179 | 10/1913 | Whitehead | 74/127 |
| 1,108,392 * | 8/1914 | Picken | 440/25 |
| 1,122,085 | 12/1914 | Dudgeon | 74/57 |
| 1,122,376 | 12/1914 | Farmer | 74/57 |
| 1,232,202 | 7/1917 | Brown | 74/57 |
| 1,316,558 | 9/1919 | Cannon | 74/57 |
| 1,389,039 | 8/1921 | Estes | 74/57 |
| 1,413,036 | 4/1922 | Krantz | 74/127 |
| 1,482,689 | 2/1924 | Landes | 74/127 |
| 1,559,578 | 11/1925 | Morgan | 74/127 |
| 1,699,687 | 1/1929 | Conterio | 74/127 |
| 1,709,952 | 4/1929 | Ricketts | 43/21 |
| 1,713,219 | 5/1929 | Eisenhauer | 74/57 |
| 1,734,649 | 11/1929 | Shull | 74/57 |
| 1,736,507 | 11/1929 | Peterson | 74/57 |
| 1,736,822 | 11/1929 | Dreisbach | 74/57 |
| 1,776,331 | 9/1930 | Lee | 74/127 |
| 1,780,398 | 11/1930 | Morgan | 74/57 |
| 1,799,458 | 4/1931 | Ekstromer | 74/57 |
| 1,813,468 | 7/1931 | Snyer | 244/64 |
| 1,955,973 | 4/1934 | Norton | 43/20 |
| 2,023,889 | 12/1935 | Kramps | 208/22 |
| 2,028,311 | 1/1936 | Berry | 43/20 |
| 2,041,319 | 5/1936 | Blomgren | 123/58 |
| 2,084,321 * | 6/1937 | Corradino et al. | 440/25 |
| 2,137,649 | 11/1938 | Hilliard | 230/173 |
| 2,143,798 | 1/1939 | Ribe | 74/280 |
| 2,153,870 | 4/1939 | Lee | 121/119 |
| 2,193,394 | 3/1940 | Deckert, Jr. | 74/57 |
| 2,245,457 | 6/1941 | Brassell | 74/57 |
| 2,296,164 | 9/1942 | Humphrey | 74/57 |
| 2,301,852 | 11/1942 | Brown | 74/275 |
| 2,321,828 | 6/1943 | Lane | 74/57 |
| 2,389,918 | 11/1945 | Macgill | 230/58 |
| 2,411,438 | 11/1946 | Lane | 103/158 |
| 2,425,813 | 8/1947 | Kuntz | 230/217 |
| 2,578,559 | 12/1951 | Korsgren | 74/60 |
| 2,588,524 | 3/1952 | Herbert | 242/82.4 |
| 2,612,312 | 9/1952 | Clarke | 230/185 |
| 2,895,576 | 7/1959 | Schwerdhofer | 192/6 |
| 2,988,186 | 6/1961 | Dotter | 192/47 |
| 3,102,436 | 9/1963 | Schuller | 74/750 |
| 3,107,541 | 10/1963 | Parsus | 74/57 |
| 3,113,472 | 12/1963 | Schwerdhofer | 74/750 |
| 3,113,652 | 12/1963 | Schwerdhofer | 192/6 |
| 3,114,442 | 12/1963 | Schwerdhofer | 192/6 |
| 3,122,226 | 2/1964 | Schuller et al. | 192/6 |
| 3,166,171 | 1/1965 | Schwerdhofer et al. | 192/64 |
| 3,192,783 | 7/1965 | Cruzan | 74/89 |
| 3,194,089 | 7/1965 | Schwerdhofer | 74/750 |
| 3,299,720 | 1/1967 | Schudalla, Sr. et al. | 74/57 |
| 3,588,144 | 6/1971 | Padial | 280/236 |
| 3,633,938 | 1/1972 | Solomon | 280/255 |
| 3,771,918 | 11/1973 | Winter | 417/266 |
| 3,809,195 | 5/1974 | Schulz et al. | 192/6 A |
| 3,828,627 | 8/1974 | Schwerdhofer | 74/750 B |
| 3,834,733 | 9/1974 | Harris | 280/251 |
| 3,877,725 | 4/1975 | Barroza | 280/242 WC |
| 3,886,807 | 6/1975 | Ellis | 74/521 |
| 3,891,235 | 6/1975 | Shelly | 280/252 |
| 3,908,807 | 9/1975 | Ozaki et al. | 192/6 A |
| 3,916,866 | 11/1975 | Rossi | 123/197 R |
| 3,922,005 | 11/1975 | Bundschuh | 280/237 |
| 3,937,309 | 2/1976 | Schulz et al. | 192/6 A |
| 3,954,282 | 5/1976 | Hege | 280/251 |
| 3,984,129 | 10/1976 | Hege | 280/251 |
| 3,991,736 | 11/1976 | Spellman | 123/197 R |
| 3,994,509 | 11/1976 | Schaeffer | 280/242 WC |
| 3,998,469 | 12/1976 | Ruys | 280/254 |
| 4,004,299 | 1/1977 | Runge | 3/1.7 |
| 4,019,230 | 4/1977 | Pollard | 280/214 |
| 4,029,334 | 6/1977 | Trammell, Jr. | 280/261 |
| 4,052,912 | 10/1977 | Vukelic | 74/512 |
| 4,081,155 | 3/1978 | Kuan | 244/72 |
| 4,084,836 | 4/1978 | Lohr | 280/254 |
| 4,145,166 | 3/1979 | Justice | 417/519 |
| 4,161,328 | 7/1979 | Efros | 280/290 |
| 4,169,609 | 10/1979 | Zampedro | 280/241 |
| 4,186,934 | 2/1980 | Collings | 280/221 |
| 4,227,712 | 10/1980 | Dick | 280/236 |
| 4,272,096 | 6/1981 | Efros | 280/255 |
| 4,276,003 | 6/1981 | Perkins et al. | 417/415 |
| 4,277,706 | 7/1981 | Isaacson | 310/80 |
| 4,400,999 | 8/1983 | Steuer | 74/781 B |
| 4,411,442 | 10/1983 | Rills | 280/221 |
| 4,421,334 | 12/1983 | Efos | 280/236 |
| 4,462,345 | 7/1984 | Routery | 123/58 C |
| 4,473,236 | 9/1984 | Stroud | 280/258 |
| 4,493,614 | 1/1985 | Chu et al. | 417/22 |
| 4,536,130 | 8/1985 | Orlando et al. | 417/63 |
| 4,560,181 | 12/1985 | Herron | 280/242 WC |
| 4,597,302 | 7/1986 | McLendon, Jr. | 74/57 |
| 4,625,580 | 12/1986 | Burt | 74/594.4 |
| 4,630,839 | 12/1986 | Seol | 280/255 |
| 4,657,273 | 4/1987 | Slater | 280/271 |
| 4,702,486 | 10/1987 | Tsuchie | 280/255 |
| 4,758,013 | 7/1988 | Agrillo | 280/242 WC |
| 4,770,433 | 9/1988 | Hartmann | 280/260 |
| 4,796,430 | 1/1989 | Malaker et al. | 62/6 |
| 4,828,284 | 5/1989 | Sandgren | 280/221 |
| 4,829,841 | 5/1989 | Ogawa | 74/127 |
| 4,861,055 | 8/1989 | Jones | 280/234 |
| 4,942,936 | 7/1990 | Gardner, Jr. | 180/207 |
| 4,958,830 | 9/1990 | Huggins et al. | 272/69 |
| 5,007,631 | 4/1991 | Wang | 272/70 |
| 5,156,412 | 10/1992 | Meguerditchian | 280/241 |
| 5,167,168 | 12/1992 | Beumer | 74/810.1 |
| 5,172,926 | 12/1992 | Mannino | 280/252 |
| 5,180,351 | 1/1993 | Ehrenfried | 482/52 |
| 5,182,962 | 2/1993 | Leiter | 74/473 |
| 5,209,190 | 5/1993 | Paul | 123/43 AA |
| 5,236,211 | 8/1993 | Meguerditchian | 280/241 |
| 5,242,181 | 9/1993 | Fales et al. | 280/251 |
| 5,280,936 | 1/1994 | Schmidlin | 280/234 |
| 5,290,054 | 3/1994 | Po | 280/288.1 |
| 5,295,927 | 3/1994 | Easley et al. | 482/52 |
| 5,299,819 | 4/1994 | Leu | 280/260 |
| 5,310,202 | 5/1994 | Goodspeed | 280/222 |
| 5,335,927 | 8/1994 | Islas | 280/255 |
| 5,443,279 | 8/1995 | Nurnberger | 280/236 |
| 5,451,070 | 9/1995 | Lindsay et al. | 280/252 |
| 5,452,647 | 9/1995 | Murakami et al. | 92/71 |
| 5,472,320 | 12/1995 | Weisbrodt | 417/326 |
| 5,486,016 | 1/1996 | Godin et al. | 280/250.1 |
| 5,514,053 | 5/1996 | Hawkins et al. | 482/63 |
| 5,540,456 | 7/1996 | Meier-Burkamp et al. | 280/236 |
| 5,542,335 | 8/1996 | Goodyear | 91/61 |
| 5,542,340 | 8/1996 | Murakami et al. | 92/71 |

* cited by examiner

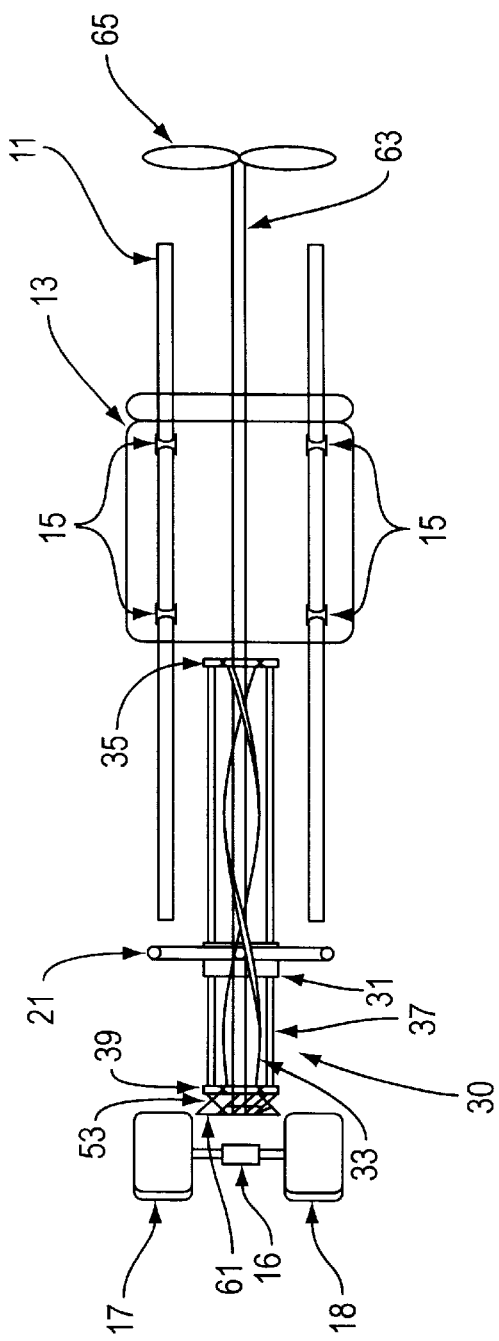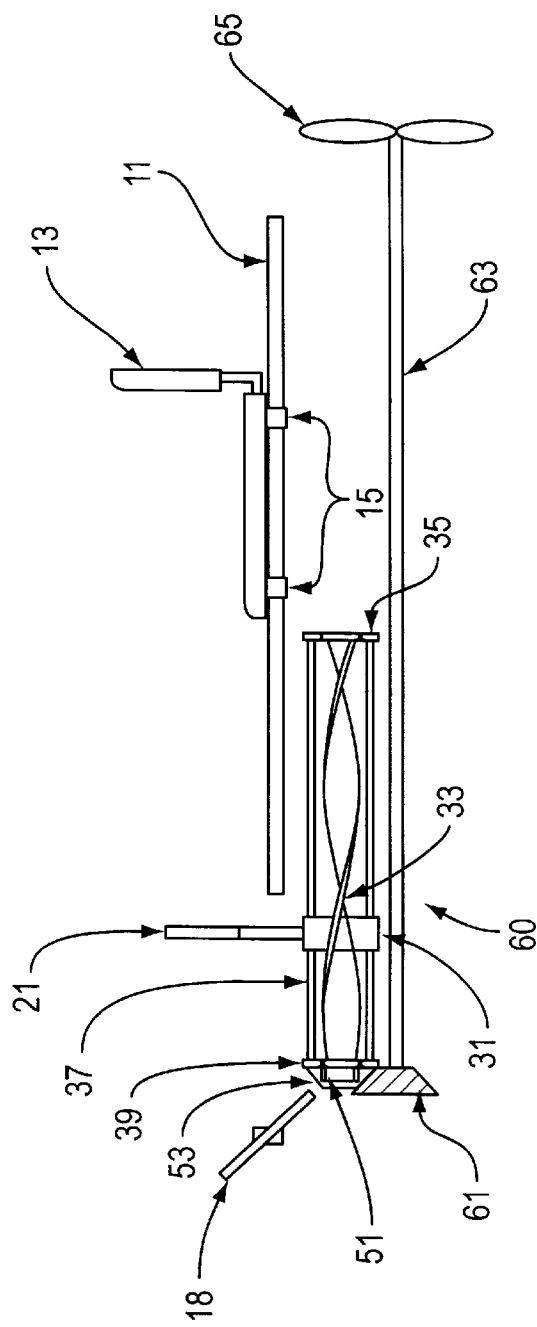
FIG. 1A
FIG. 1B

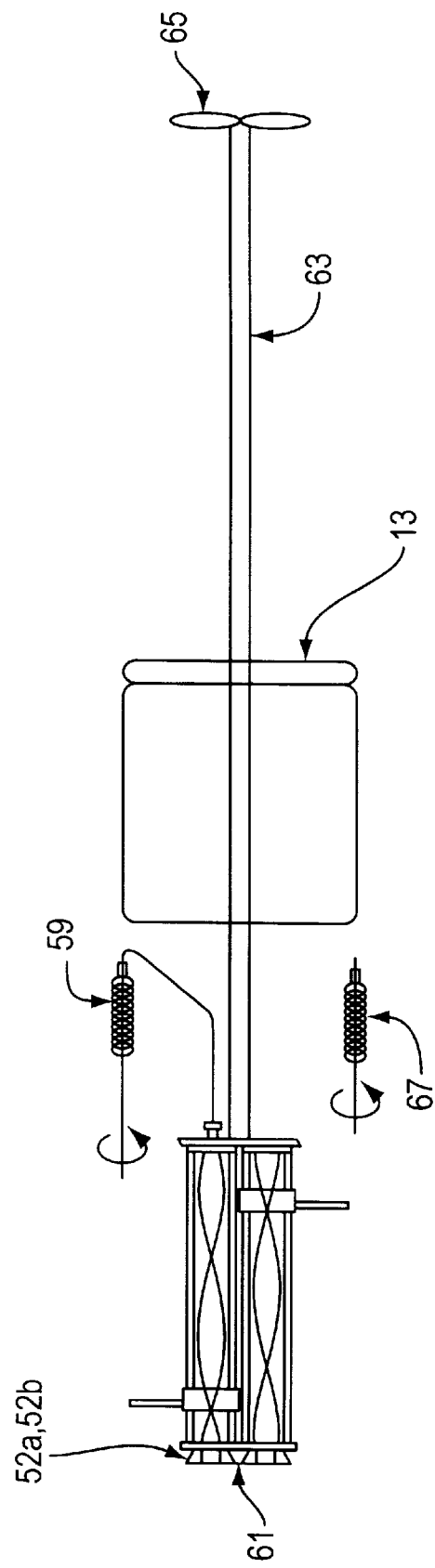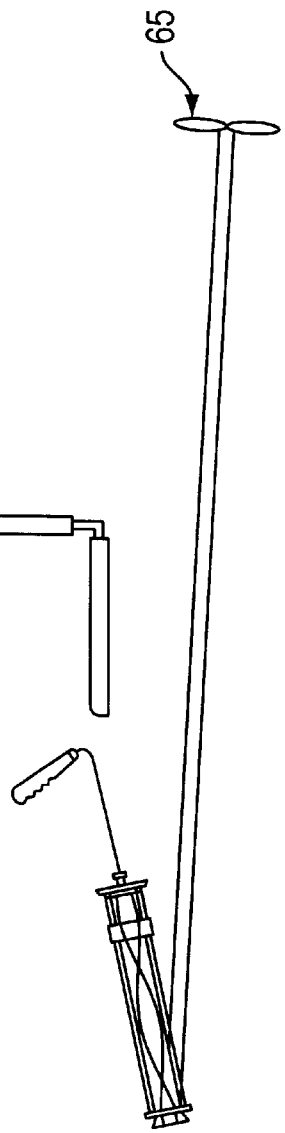

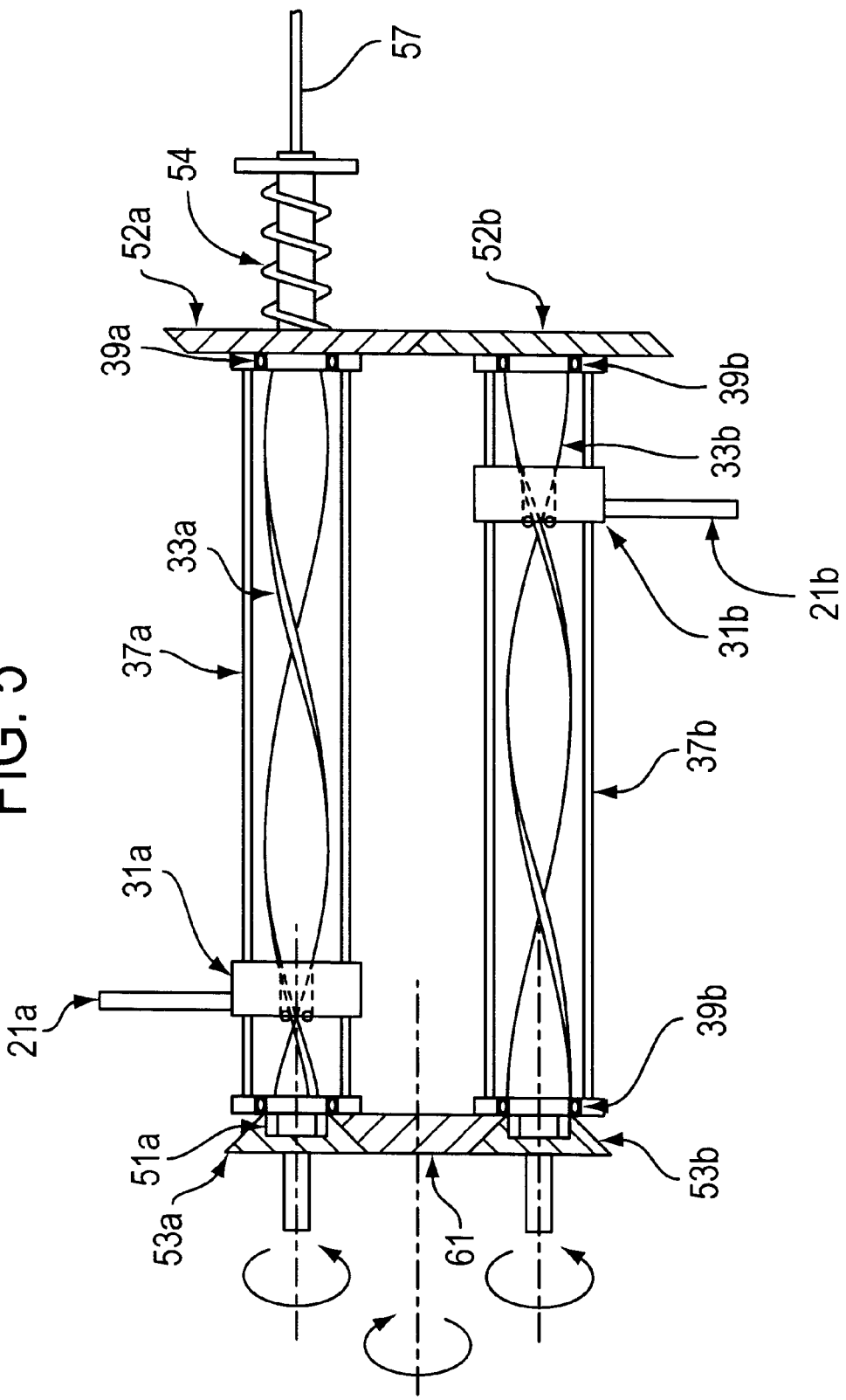

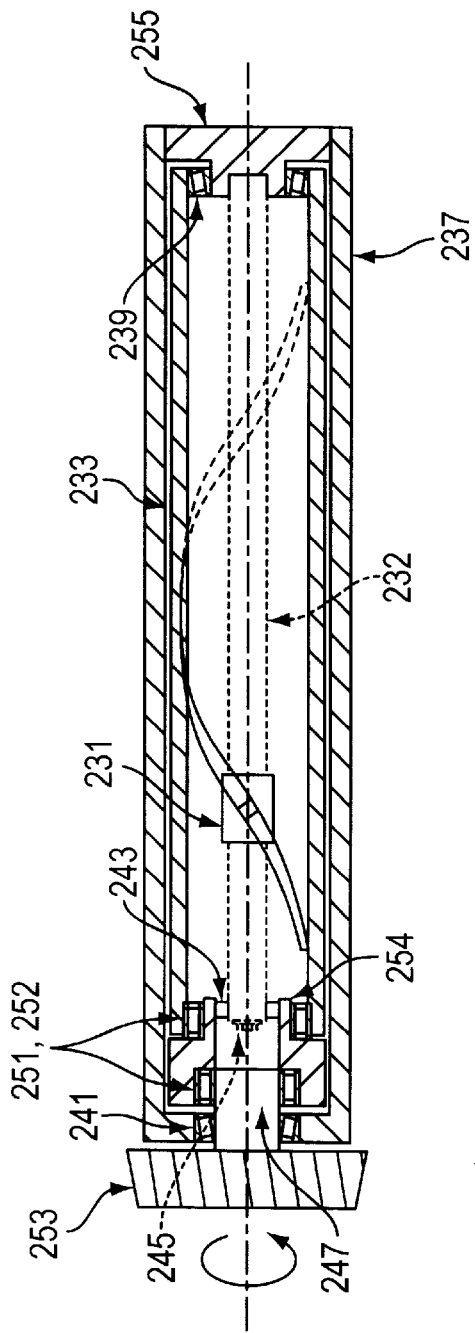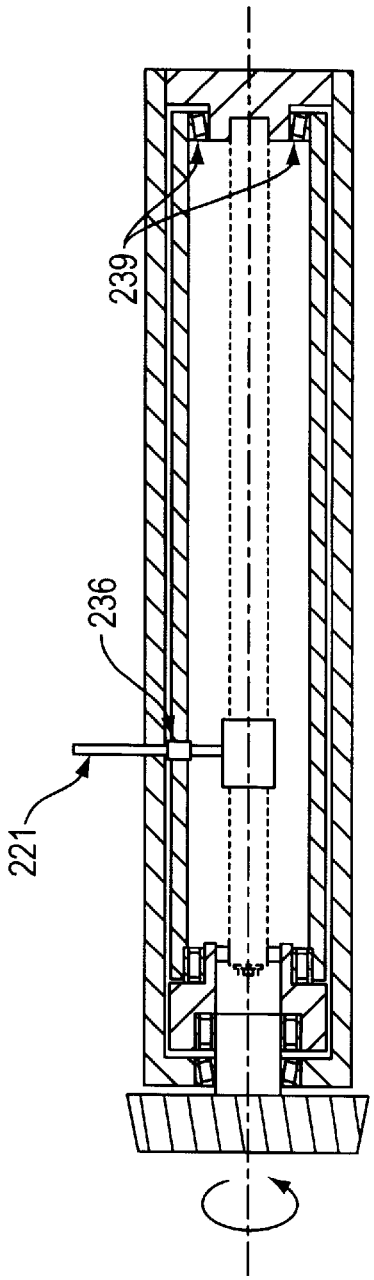

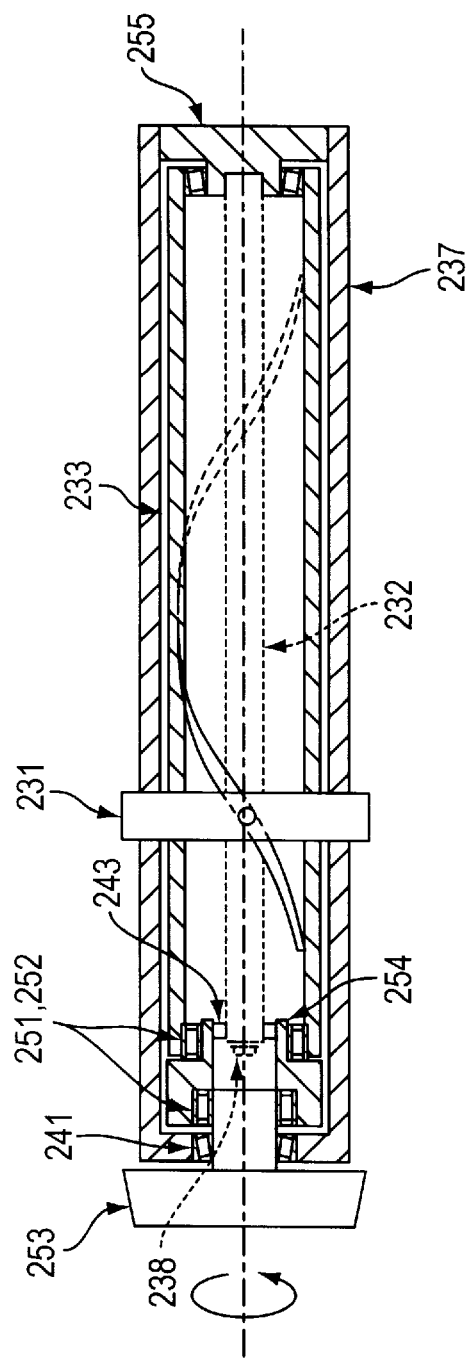
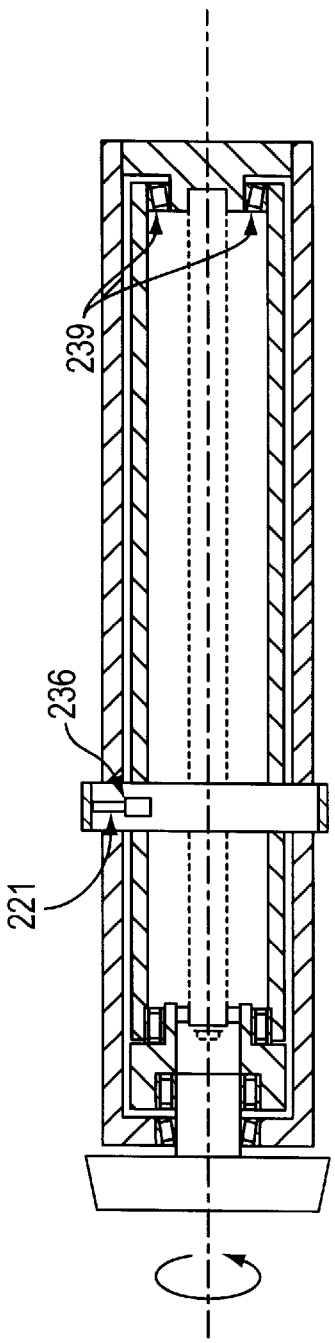
FIG. 11A
FIG. 11B

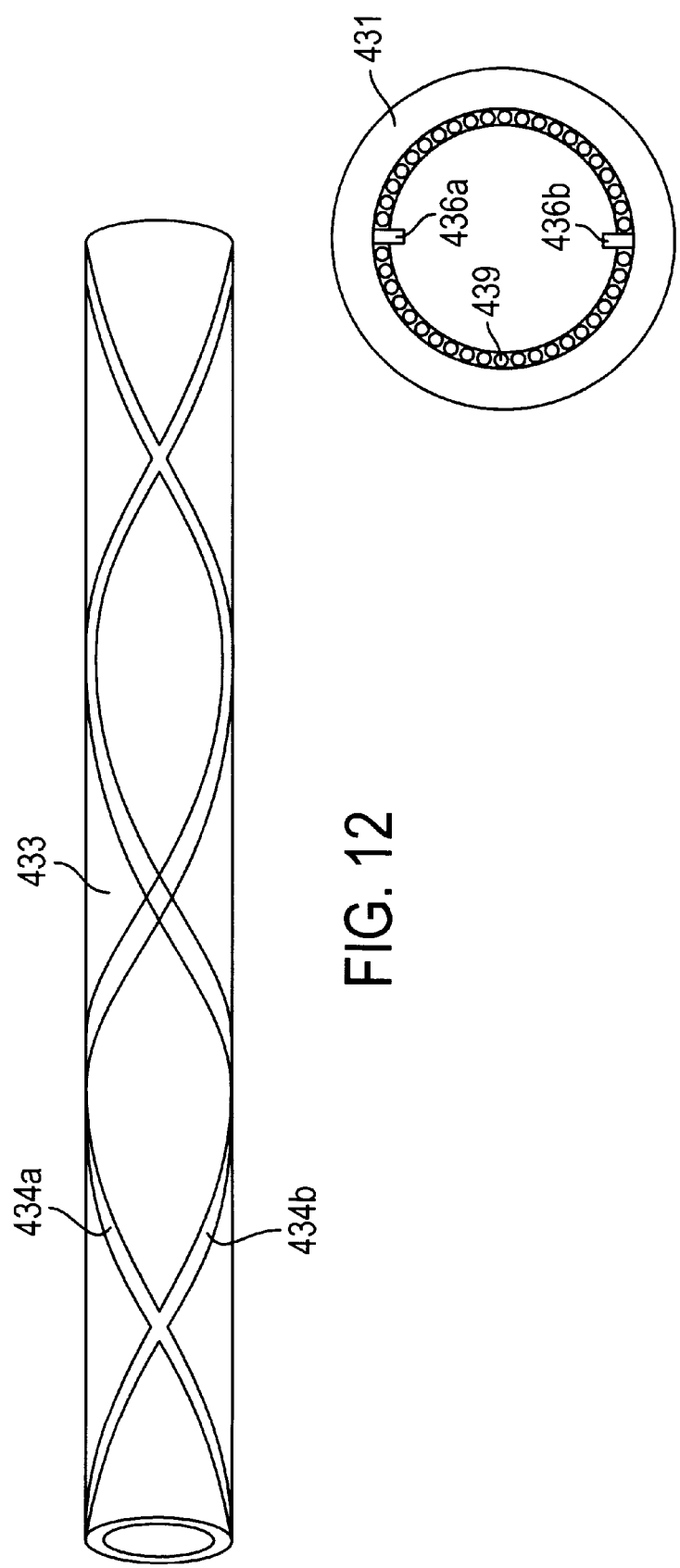

HELICAL DRIVE HUMAN POWERED BOAT

CROSS REFERENCE TO RELATED APPLICATIONS

This application is a continuation-in-part of U.S. application Ser. No. 08/771,982, filed on Dec. 23, 1996 and entitled "Helical Drive Bicycle". This application also claims priority of U.S. Provisional Application Ser. No. 60/050,275, filed Jun. 20, 1997 and entitled "In-line Multi-Gear System for Bicycles and Other Applications, Multiple Multi-Gear Systems and Shifting Devices"; U.S. Provisional Application Ser. No. 60/049,101, filed Jun. 9, 1997 and entitled "Helical Drive Human Powered Boat"; U.S. Provisional Application Ser. No. 60/049,509, filed Jun. 9, 1997 and entitled "Multi-Gear Hub, In-Line Multi-Gear System, and Vehicles"; U.S. Provisional Application Ser. No. 60/045,326, filed May 1, 1997 and entitled "Multiple Ratio Slotted Helix"; U.S. Provisional Application Ser. No. 60/044,462, filed Apr. 17, 1997 and entitled "Polycycle II"; U.S. Provisional Application Ser. No. 60/044,137, filed Apr. 16, 1997 and entitled "Improved Helical Drives"; U.S. Provisional Application Ser. No. 60/043,762, filed Apr. 8, 1997 and entitled "Helical Drive Vehicles"; U.S. Provisional Application Ser. No. 60/041,924, filed Apr. 7, 1997 and entitled "Helical Drive and Motors"; U.S. Provisional Application Ser. No. 60/042,964, filed Apr. 7, 1997 and entitled "Helical Fishing Reels"; and U.S. Provisional Application Ser. No. 60/042,963, filed Apr. 7, 1997 and entitled "Polycycle"; and U.S. Provisional Application Ser. No. 60/049,507, filed Jun. 9, 1997 and entitled "Improved Slider and Helical Drives"; and U.S. Provisional Application Ser. No. 60/049,102, filed Jun. 9, 1997 and entitled "Helical Drive Fitness, Equipment, Wench, Contained Mono-Helix Drive". The contents of the U.S. patent application Ser. No. 08/898,039, filed Jul. 18, 1997 and entitled "In-Line Multi-Gear Transmission System and Multi-Gear Wheel Hub in a Helical Drive System", are hereby incorporated by reference.

BACKGROUND OF THE INVENTION

1. Field of the Invention

The present invention is related to human powered boats, and in particular to a boat which is powered by a helical drive mechanism.

2. Description of the Related Art

A conventional human powered row boat includes two oars which extend from the sides of the boat. The user lowers the oars into and drives the oars against the water to propel the boat during a power stroke. On the return stroke, the user raises the oars out of the water and moves the oars back to a position so that a power stroke can be re-initiated.

Therefore, the ends of the oars travel into and out of the water in an oval-shaped path. Thus, the user is forced to perform a rather awkward motion to move the oars. Furthermore, the user is forced to exert energy to the lift the oars out of the water on the return stroke.

A conventional human powered paddle boat includes two pedals which extend in front of and/or below the user's seat. The user drives the pedals in a rotary motion similar to driving a conventional bicycle. The motion of the pedals provides a force to a power transmission mechanism for propelling the boat.

Inherent in the rotary motion of each pedal are dead spots. Such dead spots occur when the pedal is closest and furthest from the main body of the user. When each pedal is in either of these two dead spots, a constant torque cannot be maintained, and therefore, a constant force cannot be provided to the power transmission mechanism from each pedal.

As disclosed in U.S. patent application Ser. No. 08/711,982 (the '982 application), a helical drive mechanism allows the user to drive the pedals in a rectilinear fashion, and thus, provides a constant torque to the power transmission mechanism. Therefore, the helical drive mechanism enables the force input onto the pedals to be transferred more efficiently. Other structure, applications, functions, and advantages are discussed in detail in the '982 application and the above-identified U.S. provisional applications.

SUMMARY OF THE INVENTION

Therefore, it is an object of this invention to provide a human powered boat having a helical drive mechanism. Thus, the force that is input by the user can be transferred in an efficient manner.

It is another object of the present invention to arrange the helical drive mechanism within the boat so that a user can propel the boat using a motion which approximately simulates the motion used to propel a conventional row boat. However, unlike the conventional row boat, the user will not be forced to awkwardly move oars in an oval-shaped path, thereby increasing his/her comfort level. Furthermore, the user will not have to exert any extra energy to lift the oars out of the water during the return stroke.

It is another object of the present invention to provide a helical drive mechanism and a power transmission mechanism which allows the boat to be propelled without the use of oars. Thus, the boat requires a smaller amount of space while being propelled to the extent that the oars do not extend beyond the sides of the boat.

It is another object of this invention to arrange two helical drive mechanisms within a boat, wherein each of the two helical drive mechanisms is attached to a foot pedal. Thus, the user can use his/her relatively stronger leg muscles to drive the helical drive mechanisms. Furthermore, since the helical drive mechanisms are driven in a rectilinear fashion, the dead spots inherent in a rotary motion are eliminated and a constant torque can be provided to the power transmission mechanism.

These and other objects, features, and characteristics of the present invention, will be more apparent upon consideration of the following detailed description and appended claims with reference to the accompanying drawings, wherein like reference numerals designate corresponding parts in the various figures.

BRIEF DESCRIPTION OF THE DRAWINGS

FIG. 1A is a top view of a helical drive mechanism and a power transmission mechanism according to a first embodiment of the present invention;

FIG. 1B is a side view of the helical drive mechanism and power transmission mechanism illustrated in FIG. 1A;

FIG. 3A is a top view of a helical drive mechanism and a power transmission mechanism according to another embodiment of the present invention;

FIG. 3B is a side view of the helical drive mechanism and power transmission mechanism illustrated in FIG. 3A;

FIG. 5 is an enlarged plan view of the helical drive mechanism illustrated in FIGS. 3A–3B and 4A–4B;

FIG. 9A is a top sectional view of the helical drive mechanism illustrated in FIG. 8;

FIG. 9B is a side sectional view of the helical drive mechanism illustrated in FIG. 8;

FIG. 11A is a top sectional view of the helical drive mechanism illustrated in FIG. 10;

FIG. 11B is a side sectional view of the helical drive mechanism illustrated in FIG. 10;

FIG. 12 is a plan view of another embodiment of the helical drive mechanism having a cylinder with a groove formed thereon;

FIG. 13 is a plan view of a slider which is used in conjunction with the cylinder illustrated in FIG. 12;

DETAILED DESCRIPTION OF THE PREFERRED EMBODIMENTS

Figure 2A:
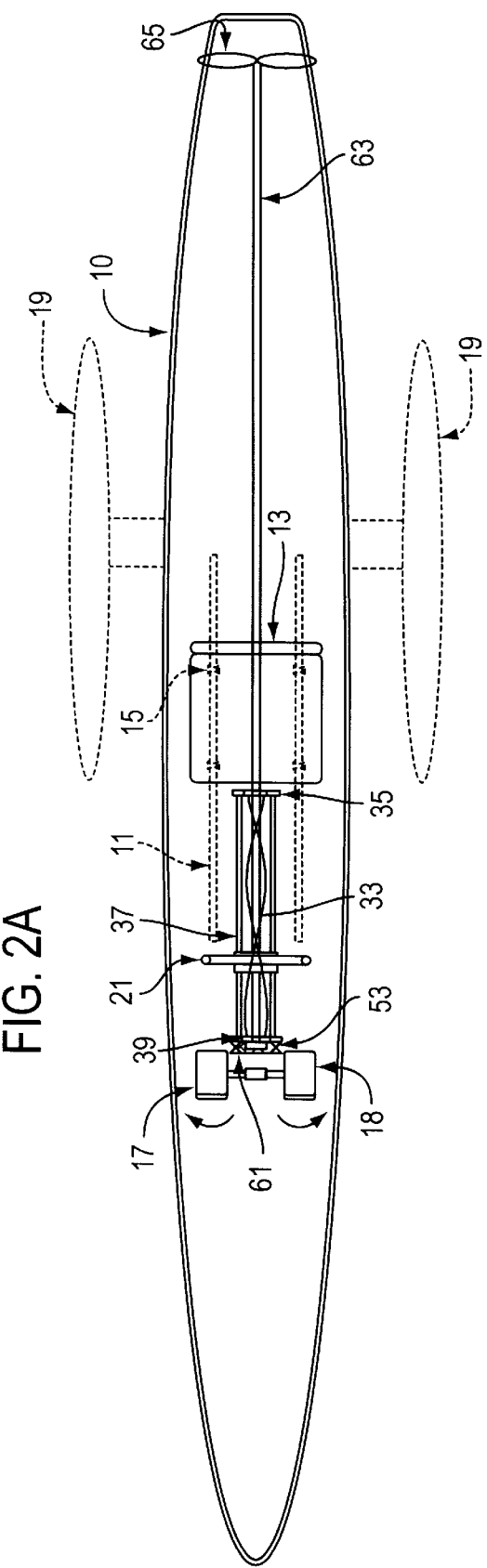
FIG. 2A is a top view of the helical drive mechanism and power transmission mechanism illustrated in FIG. 1A arranged in the hull of a boat.

FIGS. 1A–1B show a first embodiment of the present invention illustrating a helical drive mechanism 30 which is attached to a force input shaft 21. The helical drive mechanism 30 includes a slider 31 which is connected to and moves with the force input shaft 21. The slider 31 is engaged around a twisted screw 33 through a hole 131 and rollers 132, 133 (see FIGS. 7A–7B). The twisted screw 33 is housed within a track device 37. The track device 37 allows the slider 31 to be moved in either direction along the twisted screw 33 and protects the twisted screw 33 and other interior components of the helical drive mechanism 30 from any debris and/or water.

As discussed in the '982 application, when the user drives the slider 31 in a first rectilinear direction along the twisted screw 33, the twisted screw 33 will be forced to rotate in a first rotary direction. Conversely, when the user drives the slider 31 in the opposite rectilinear direction along the twisted screw 33, the twisted screw 33 will be forced to rotate in the opposite rotary direction.

Both ends of the twisted screw 33 are coaxially attached to and rotate bearings 39. Each of the bearings 39 is supported within mounting plates 35. One of the bearings 39 is coaxially connected to a one-way roller clutch 51. The one-way roller clutch 51 rotates with the bearing 39 in one rotary direction, but free wheels in the other direction. The one-way roller clutch 51 is coaxially connected to and rotates an input gear 53.

A power transmission mechanism 60 transfers the force generated by a user acting on the helical drive mechanism 30. As shown in FIGS. 1A–1B, the power transmission mechanism 60 includes an output gear 61, a drive line 63 and a propeller 65. The input gear 53 of the helical drive mechanism 30 is meshed with and rotates output gear 61. The output gear 61 is connected to and rotates drive line 63, which, in turn, rotates propeller 65.

Figure 2B:
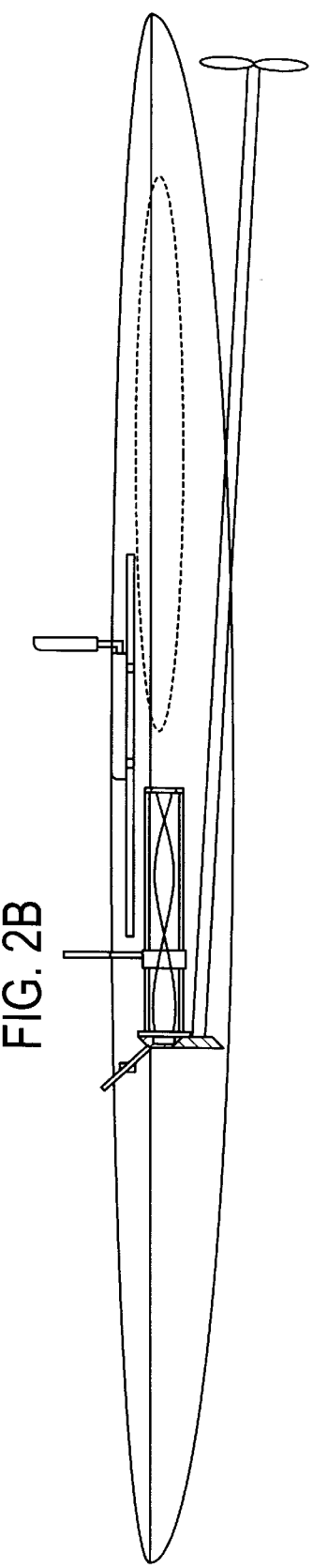
FIG. 2B is a side of the helical drive mechanism, power transmission mechanism and boat hull illustrated in FIG. 2A.
Figures 4A, 4B:
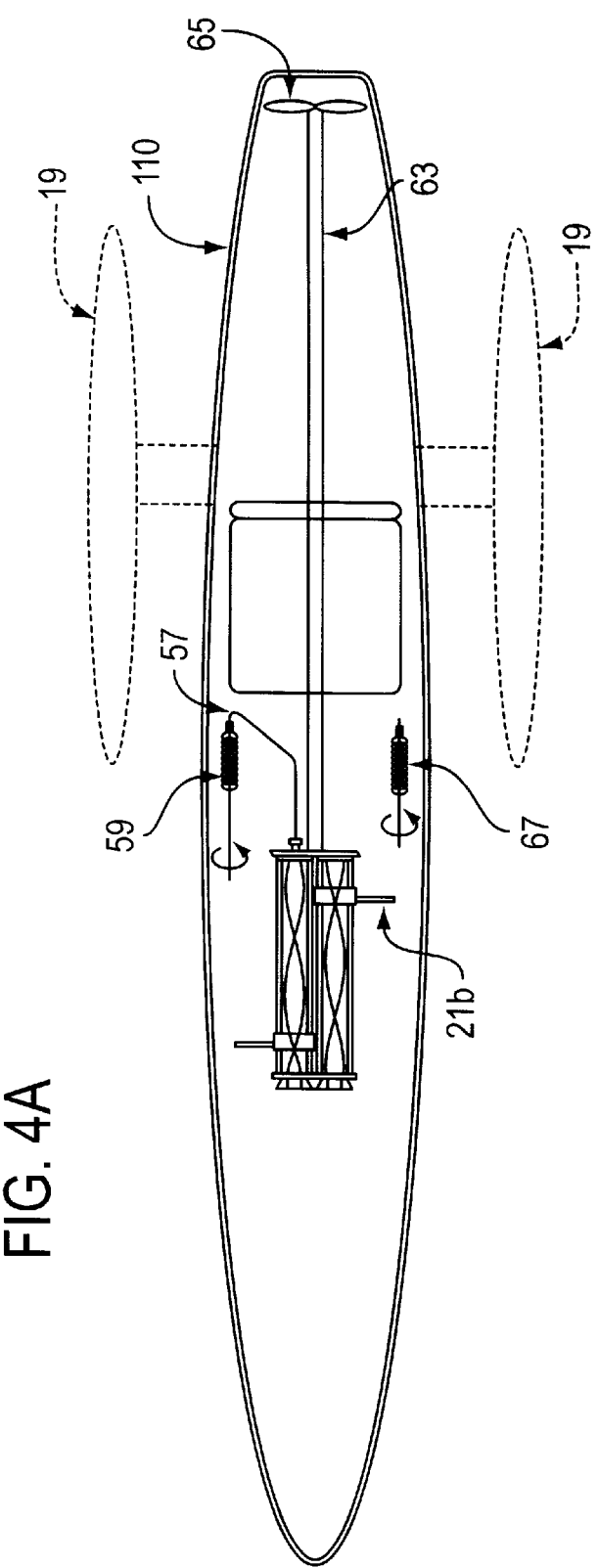
FIG. 4A is a top view of the helical drive mechanism and power transmission mechanism illustrated in FIG. 3A arranged in the hull of a boat.
FIG. 4B is a side of the helical drive mechanism, power transmission mechanism and boat hull illustrated in FIG. 4A.

FIGS. 2A–2B show an arrangement of the force input shaft 21, helical drive mechanism 30 and the power transmission mechanism 60 as components of a boat 10. The boat 10 also includes a seat 13 slidably mounted on two guide rails 11. A foot holder 16 including right and left pedals 17, 18 are mounted to the boat 10 in front of the seat 13. Pontoons 19 extend from both sides of the boat 10 and may be used for steering. Alternatively, rudders may be used to steer the boat 10. The steering of the boat 10 via the pontoons 19 (or rudders) is controlled by the user through the foot pedals 17, 18.

The helical drive mechanism 30 is arranged substantially parallel to the two guide rails 11. The helical drive mechanism 30 is also arranged below and between the guide rails 11 so that the force input shaft 21, which extends therefrom, can be slidably configured between the foot pedals 17, 18 and the back of the seat 13. Thus, the user can grab the force input shaft 21 with his/her hands and drive the boat 10 with a motion which is similar to (but not identical to) the motion required to propel a row boat.

The force generated by the user driving the force input shaft 21 and helical drive mechanism 30 is ultimately transferred to the propeller 65. While FIG. 2B shows the propeller 65 being disposed below the hull of the boat 10 to act against water, it is equally feasible that the propeller 65 be disposed above the water level supporting the boat 10 so that the propeller 65 acts against air (see FIG. 15).

Therefore, the user can propel the boat 10 without the use of oars, and thus, the boat 10 can be driven through a narrower area. Furthermore, since the user provides a rectilinear motion to propel the boat 10, any awkward movements can be avoided and a smooth stroke maintained. Also, the user does not have to waste his/her energy to lift the oars out of the water during a return stroke.

FIGS. 3A–3B and 4A–4B show another embodiment of a boat 110. FIG. 5 shows the details of the helical drive mechanisms 30a, 30b used in the boat 110. The reference numbers corresponding to parts previously described for the previous embodiments remain the same. Only the differences from the previous embodiments shall be discussed.

The helical drive mechanisms 30a, 30b respectively include sliders 31a, 31b. The sliders 31a, 31b are respectively connected to force input shafts 21a, 21b and engaged around twisted screws 33a, 33b. The twisted screws 33a, 33b have the same angle. That is, both of the twisted screws 33a, 33b are either "right-handed" or "left-handed". The twisted screws 33a, 33b are respectively attached to input gears 53a, 53b at a first end through bearings 39a, 39b and one-way roller clutches 51a, 51b. Both of the input gears 53a, 53b are meshed with the output gear 61.

The twisted screws 33a, 33b are respectively attached at a second end to synchronization gears 52a, 52b through bearings 39a, 39b. The synchronization gear 52a is connected to a cable 57. The cable 57 and a compressible spring 54 can be used to position the synchronization gear 52a with respect to the synchronization gear 52b. For example, by pulling the cable 57 and locking the synchronization gear 52a into the appropriate place via the spring 54, the synchronization gears 52a, 52b can be meshed with one another. In this meshed configuration, the sliders 31a, 31b will be forced to linearly move in reciprocally opposite directions since the rotation of one of the twisted screws 33a, 33b will force the other to rotate in the opposite directions via the meshed synchronization gears 52a, 52b. Alternatively, the cable 57 and spring 54 can be used to position the synchronization gear 52a so that it is not meshed with synchronization gear 52b. In this position, the sliders 31a, 31b can be moved independently of one another.

As shown in FIGS. 3A–3B and 4A–4B, the helical drive mechanisms 30a, 30b are arranged in front of and substantially below the seat 13 so that the force input shafts 21a, 21b can accommodate the user's feet. Thus, unlike the embodiment illustrated in FIGS. 1A–1B and 2A–2B, there is no need for a foot holder. Furthermore, the seat 13 is stationary with respect to the hull of the boat 110 so that the user can drive the force input shafts 21a, 21b using his/her relatively stronger leg muscles.

A steering handle 67 is arranged in an area which is close enough to the seat 13 so that an user can easily reach it with his/her hands. The steering handle 67 can be rotated clockwise or counterclockwise to control the steering mechanism to thereby direct the boat 110.

A synchronization handle 59 is also arranged in an area which is close to the seat 13 so that an user can easily reach it with his/her hands. The synchronization handle 59 is connected to the cable 57 and can be rotated clockwise or counterclockwise to thereby control the position of the synchronization gear 52a through the cable 57 and spring 54.

Figure 6A:
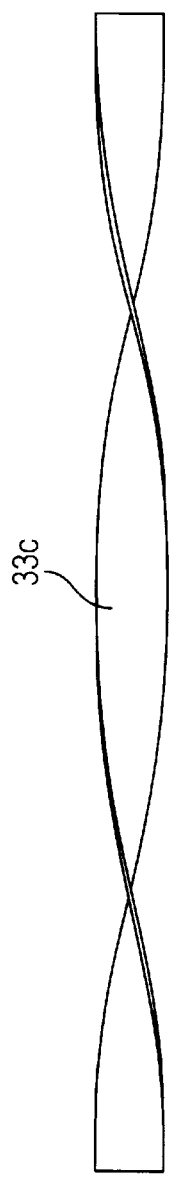
FIGS. 6A–6C are plan views of different embodiments of helical screws which can be used in the helical drive mechanisms illustrated in FIGS. 1A–1B, 2A–2B, 3A–3B and 4A–4B.
Figure 6B:
Figure 6C:

FIGS. 6A–6C show various twisted screws which can be used as a component in the helical drive mechanism 30 illustrated in FIGS. 1A–1B and 2A–2B or the helical drive mechanisms 30a, 30b illustrated in FIGS. 3A–3B and 4A–4B.

FIG. 6A shows a twisted screw 33c which has a uniform turn rate. FIGS. 6B–6C show twisted screws 33d, 33e which have a turn rate which varies. For example, the twist rate in each of the twisted screws 33d, 33e is greater in the left portion (as shown in FIGS. 6B–6C) of the twisted screws 33d, 33e than in the right portion. The turn rate of the twisted screws 33d, 33e is varied to accommodate the application of power by the user onto the helical drive mechanism 30 (or 30a, 30b). During the first portion of the power stroke, the turn rate is gradual to facilitate the initial application of force by the user onto the helical drive mechanism 30. As the power stroke progresses, the rotational velocity of the helical screws 33d, 33e would tend to increase if more resistance were not provided. Thus, additional resistance is provided from the increased turn rate. This increased turn rate allows greater amounts of power to be transferred onto the input gear 53 (or 53a, 53b), and allows the slider 31 (or 31a, 31b) and force input shaft 21 (or 21a, 21b) to be driven at a substantially uniform speed through the length of the power stroke. The uniform velocity of the force input shaft 21 allows maximum power to be transferred to the propeller 65 while preventing the user's muscles from tiring due to variations of effort.

Figure 7A:
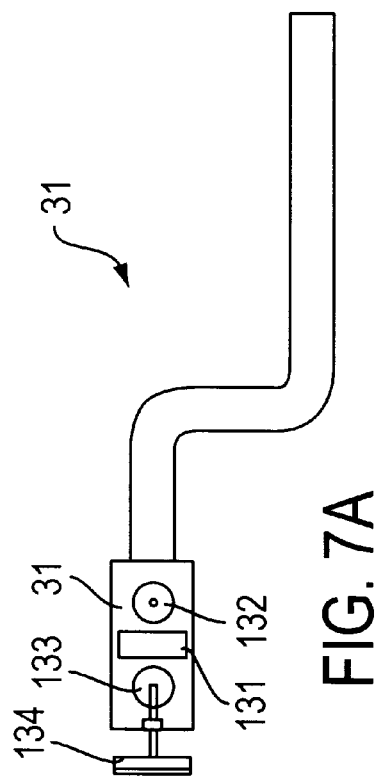
FIG. 7A is a front plan view of a slider and a force input shaft which can be used in the helical drive mechanisms illustrated in FIGS. 1A–1B, 2A–2B, 3A–3B and 4A–4B.
Figure 7B:
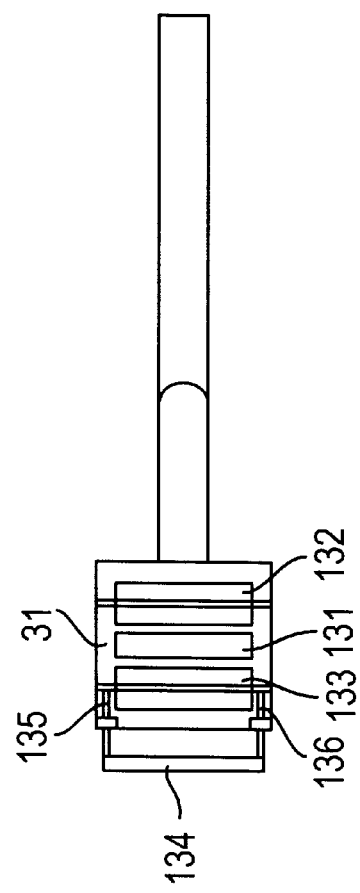
FIG. 7B is a top plan view of the slider and force input shaft illustrated in FIG. 7A.

FIGS. 7A–7B show a slider 31 (or 31a, 31b) which can be used as a component in the helical drive mechanism 30 illustrated in FIGS. 1A–1B and 2A–2B or the helical drive mechanisms 30a, 30b illustrated in FIGS. 3A–3B and 4A–4B. The slider 31 includes a hole 131 through which the helical screw 33 (or 33a, 33b) passes. A fixed roller 132 is arranged on one side of the hole 131 and an adjustable roller 133 is arranged on the other side. The adjustable roller 133 is biased by springs 135, 136 to press the roller 133 tightly against the twisted screw 33. The springs 135, 136 allow the slider 31 to be moved along the twisted screw 33 without jamming even if debris is located on the twisted screw 33. The position of the adjustable roller 133 is controlled by dial 134.

Figure 8:
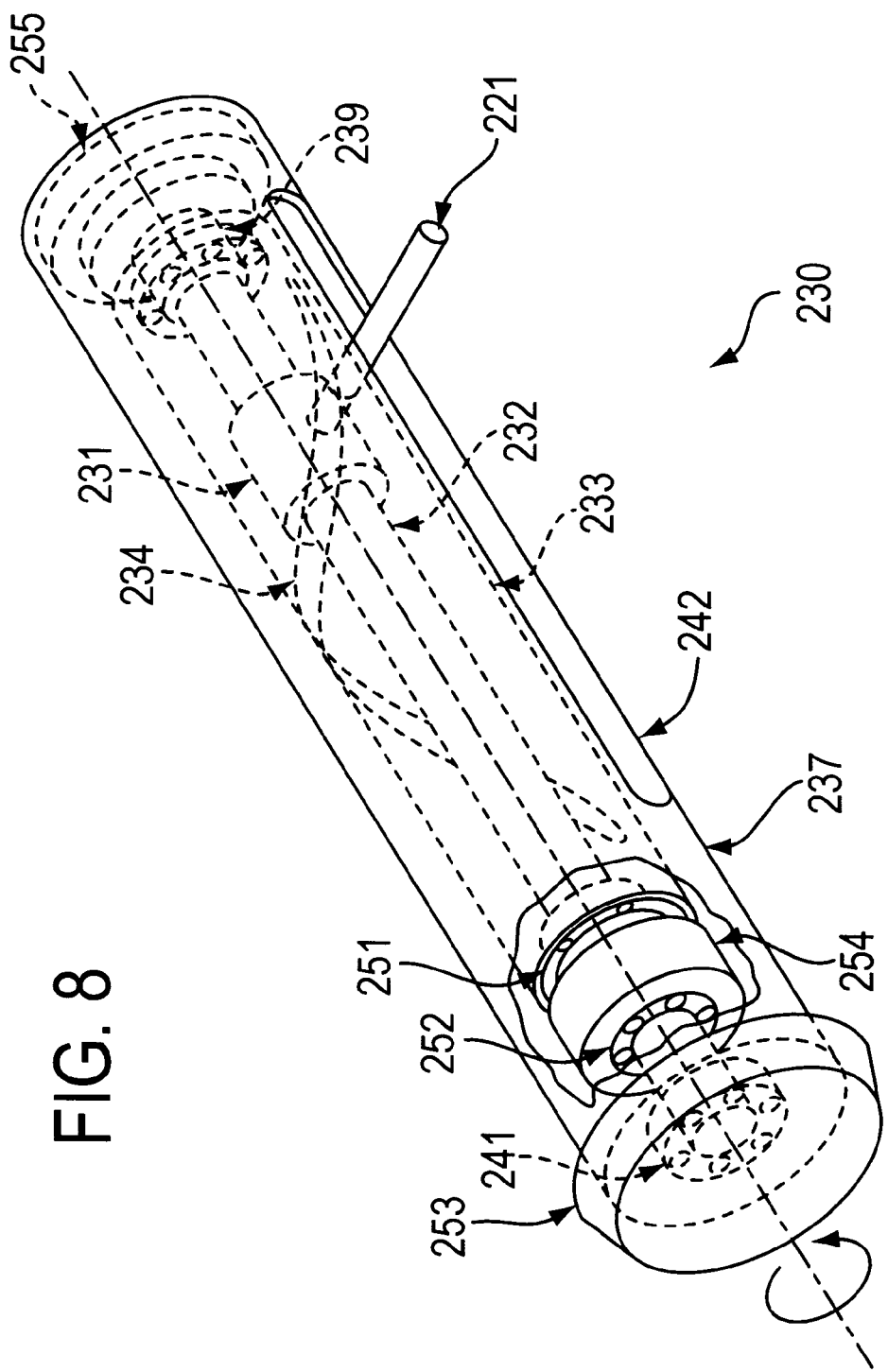
FIG. 8 is a perspective view of another embodiment of the helical drive mechanism having a slotted cylinder and a slider arranged within the cylinder according to the present invention.

FIGS. 8 and 9A–9B show another embodiment of the helical drive mechanism 230 which can be substituted for any of the helical drive mechanisms 31, 31a, 31b discussed above. The helical drive mechanism 230 includes a cylinder 233 having a slot 234 formed therethrough. The slot 234 travels in a helical path along the cylinder 233 which can have an uniform or variable turn rate as shown in FIGS. 6A–6C. A slider 231 is enclosed within the cylinder 233 and slidably engaged on a stationary shaft 232 and with the cylinder 233 by a shaft roller 236. The slider 231 is attached to and moves in parallel with a force input shaft 221. The cylinder 233 is enclosed within an outer casing 237. The outer casing 237 has a linear slot 242 to allow the force input shaft 221 to pass and move therethrough.

A bearing 239 is attached to the cylinder 233 and engaged around stationary shaft 232 at one end of the cylinder 233 and shaft 232. The bearing 239 is mounted on end cap 255. Another bearing 243 is attached to the other end of the cylinder 233 through a one-way roller clutch 251 and a carrier 254. The bearing 243 is attached to the stationary shaft 232 by a fastener 245. Another one-way roller clutch 252 is supported within the carrier 254 and contacts a cylinder 247 which is connected to a gear 253. Another bearing 241 is mounted within an end of the outer casing 237 and contacts the cylinder 247.

The operation of the helical drive mechanism 230 is as follows. As the force input shaft 221 is driven in a rectilinear motion by the user, the slider 231 is driven therewith along the length of the stationary shaft 232. Since the input shaft 221 is engaged with the helical slot 234 by the shaft roller 236, the rectilinear motion of the force input shaft 221 forces the cylinder 233 to rotate. The rotary motion of the cylinder 233 is transferred to the gear 253 through the corresponding rotation of the roller clutches 251, 252, carrier 254 and cylinder 247.

Figure 10:
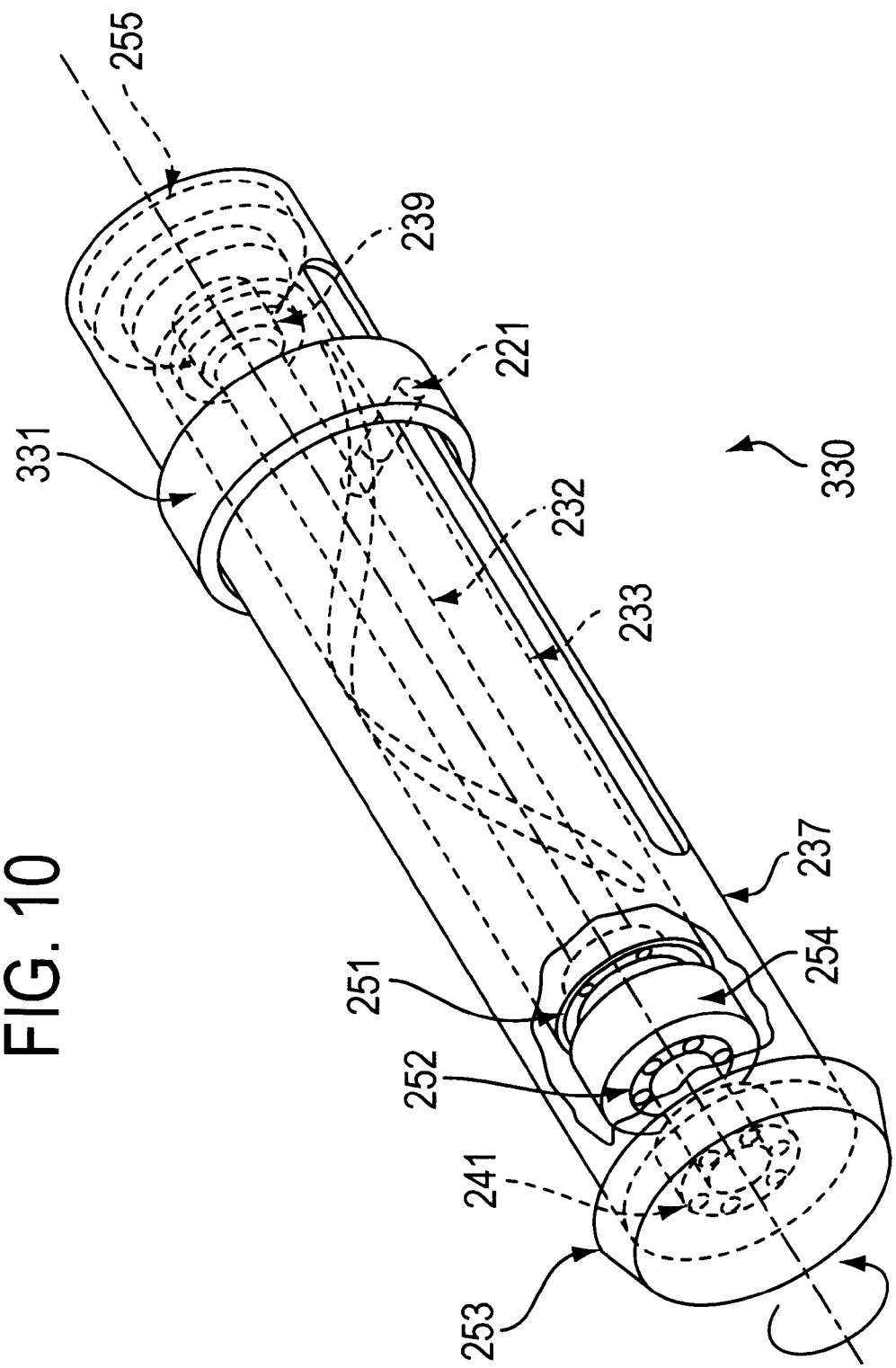
FIG. 10 is a perspective view of another embodiment of the helical drive mechanism having a slotted cylinder and a slider arranged around the cylinder according to the present invention.

FIGS. 10 and 11A–11B show another embodiment of the helical drive mechanism 330 which can be substituted for any of the helical drive mechanisms discussed above. The reference numbers corresponding to parts previously described for the previous embodiments remain the same. Only the differences from the previous embodiments shall be discussed.

The helical drive mechanism 330 is similar to the helical drive mechanism 230 illustrated in FIGS. 8 and 9A–9B. However, the helical drive mechanism 330 includes a slider 331 which is arranged around the cylinder 233 and the outer casing 237. The outer surface of the slider 331 is connected to the force input shaft 221 and the inner surface of slider 331 is connected to the shaft roller 236.

FIG. 12 shows a cylinder 433 which can be used in conjunction with any of the helical drive mechanisms discussed above. For example, the cylinder 433 can be substituted for the helical screw 33 (or 33a, 33b) or cylinder 233. The cylinder 433 includes two grooves 434a, 434b which travel in a helical path along the length of cylinder 433.

FIG. 13 shows a slider 431 which is engaged around the cylinder 433 illustrated in FIG. 12. The slider 431 includes two splines 436a, 436b which are engaged with grooves 434a, 434b, respectively. Bearings 439 are arranged on the inside surface of the slider 431 to provide a smooth contact with the cylinder 433. The helical path of the grooves 434a, 434b may turn at a uniform or variable rate in the manner disclosed in FIGS. 6A–6C.

Figure 14:
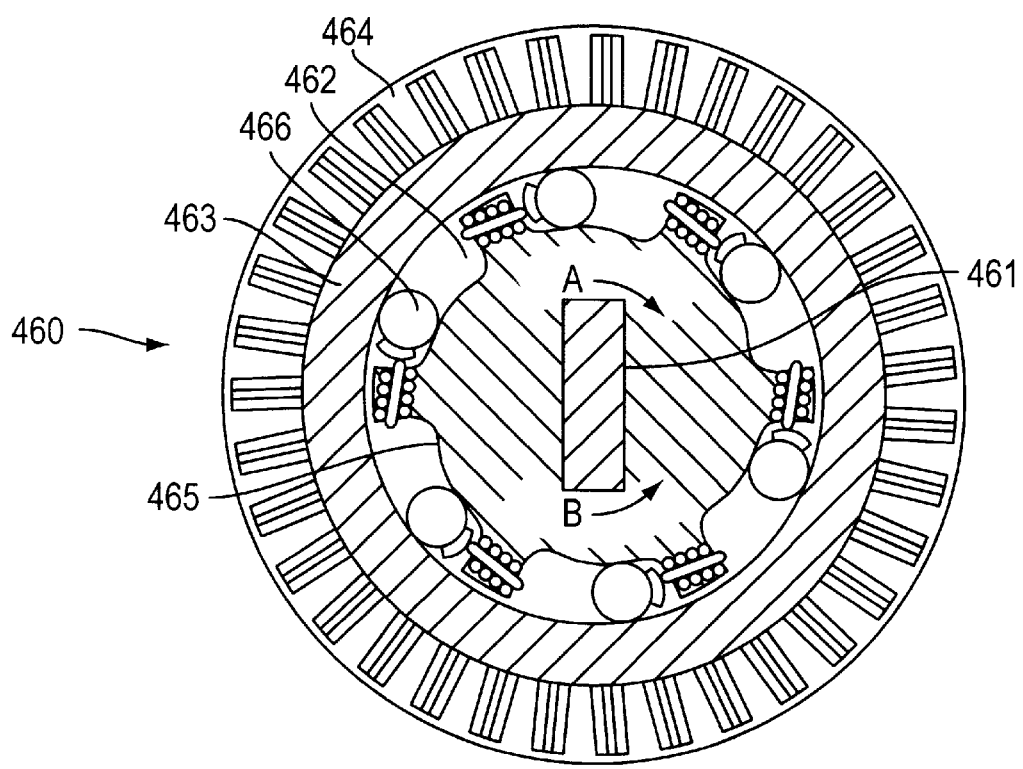
FIG. 14 is a plan view of a clutch according to the present invention.

FIG. 14 shows an overrunning clutch 460 which can be incorporated into the power transmission mechanism of the present invention. The overrunning clutch 460 includes a bar 461 which is fit as a spline within a rotary vane 462. The rotary vane 462 is locked to the bar 461 so that when the bar 461 rotates, the rotary vane 462 also rotates. The rotary vane 462 is fit within a tubular sleeve 463. The tubular sleeve 463 is connected to a pinion gear 464. The rotary vane 462 has sloped shoulders 465 which function to wedge cylindrical rollers 466 when the rotary vane 462 rotates in the direction indicated by arrow A, but free wheels when the rotary vane 462 rotates in the direction indicated by arrow B.

Additional advantages and modifications will readily occur to those skilled in the art. Therefore, the invention is not limited to the specific details and representative devices shown and described herein. Accordingly, various modifications may be made to the embodiments of the invention without departing from the spirit or scope of the invention as defined by the appended claims.

For example, while the grooves 434a, 434b illustrated in FIG. 12 are formed on the outer surface of the cylinder 433, the grooves 434a, 434b can be formed on the inner surface of the cylinder 433. Accordingly, at least a portion of the slider engaged therewith is arranged within the cylinder 433.

Figure 15:
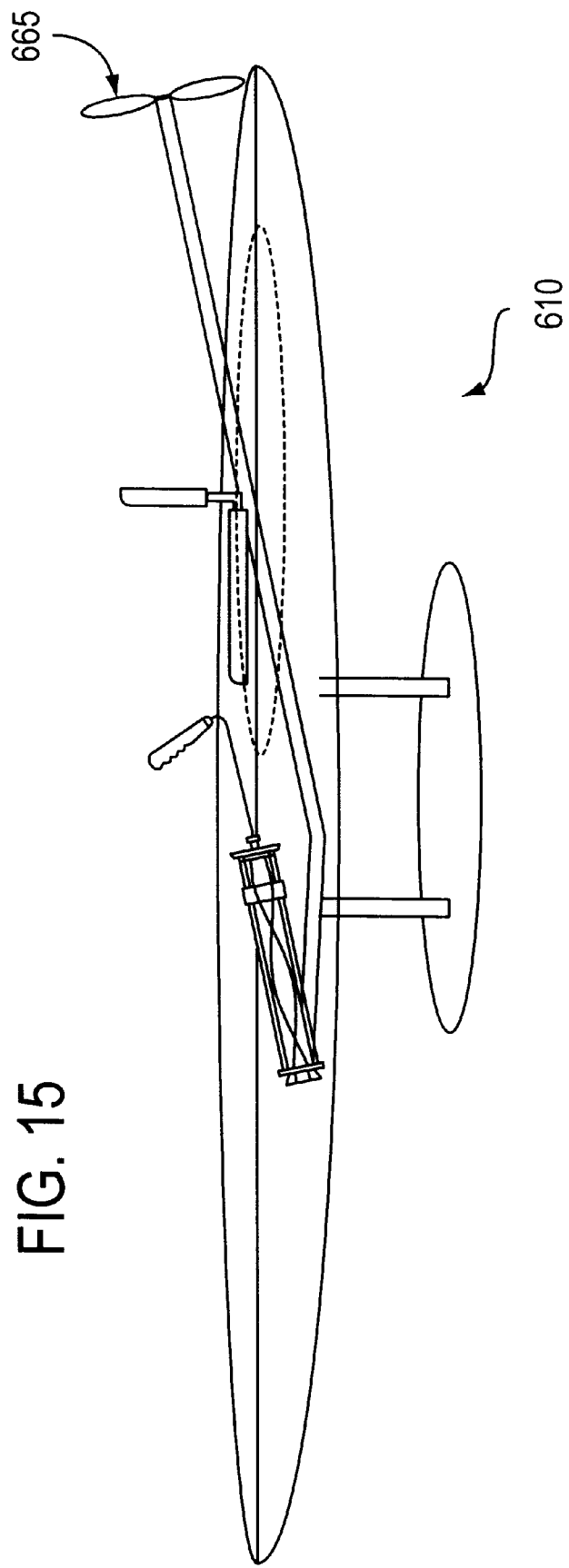
FIG. 15 is a side view of a hydro-foil boat according to the present invention.
Figure 16:
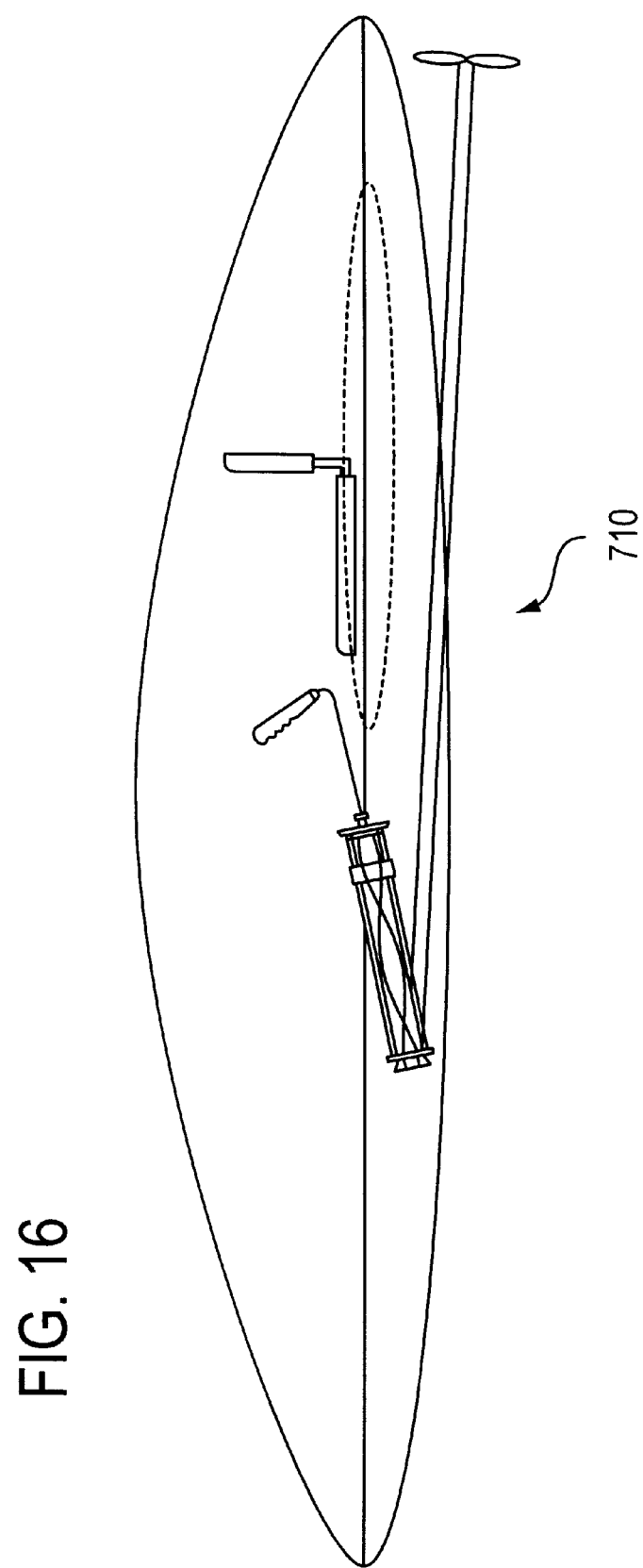
FIG. 16 is a side view of a submersible boat according to the present invention.

Furthermore, FIG. 15 shows the helical drive mechanism used as a component in a hydro-foil boat 610 having an air propeller 665. FIG. 16 shows the helical drive mechanism used as a component of a submersible boat 710.

Also, a multi-gear hub and/or an in-line multi-gear mechanism can be incorporated into the present invention. A fuller, detailed description of the multi-gear hub and the in-line multi-gear mechanism is provided in U.S. patent application Ser. No. 08/898,039, filed Jul. 18, 1997 and entitled "In-Line Multi-Gear Transmission System and Multi-Gear Wheel Hub in a Helical Drive System" which is incorporated herein by reference. The multi-gear hub and the in-line mechanisms permit the transmission (gear) ratio between the output of the helical drive mechanism and the output provided to the propeller to be shifted. Shifting the transmission ratio allows the same input torque or power to provide different levels of output torque to the propeller. For example, the drive line 63, the twisted screw 33 (or 33a, 33b) or the cylinder 233 of the present invention can be connected to an in-line multi-gear mechanism. Moreover, the input gear 53 (or 53a, 53b or 253) may be meshed with a multi-gear hub.

What is claimed is:

1. A boat comprising:
   a) a first shaft for receiving a first input force;
   b) a second shaft for receiving a second input force;
   c) a first helical drive mechanism connected to said first shaft;
   d) a second helical drive mechanism connected to said second shaft;
   e) a power transmission mechanism coupled to said first and second helical drive mechanisms for driving said boat;
   f) a seat, wherein said first and second helical drive mechanisms are arranged in front of and substantially below said seat;
   g) a pontoon; and
   h) a steering mechanism, wherein said steering mechanism is controlled by a steering handle;
   wherein said first helical drive mechanism comprises:
   a) a first helical screw;
   b) a first slider connected to said first shaft and slidably engaged with said first helical screw, wherein said first slider includes:
      1) a first hole through which said first helical screw passes;
      2) first rollers contacting said first screw; and
   c) wherein a turn rate of said first helical screw varies;
   d) a first one-way roller clutch connected to a first end of said first helical screw;
   e) a first pinion gear connected to said first one-way roller clutch; and
   wherein said second helical drive mechanism comprises:
   a) a second helical screw;
   b) a second slider connected to said second shaft and slidably engaged with said second helical screw, wherein said second slider includes:
      1) a second hole through which said second helical screw passes; and
      2) second rollers contacting said second screw;
   c) wherein a turn rate of said second helical screw varies;
   d) a second one-way roller clutch connected to a first end of said second helical screw; and
   e) a second pinion gear connected to said second one-way roller clutch;
   wherein said power transmission mechanism comprises:
   a) an output gear meshed with said first and second pinion gears;
   b) a drive line having a first and a second end, wherein said first end of said drive line is connected to said output gear; and
   c) a water propeller connected to said second end of said drive line.

2. The boat as claimed in claim 1, wherein said boat further comprises:
   a) a first guide rail;
   b) a second guide rail;
   c) a seat slidably mounted on said first and second guide rails; and
   d) wherein at least a portion of said helical drive mechanism is arranged below and between said first and second guide rails.

3. A boat comprising:
   a) a shaft for receiving an input force;
   b) a helical drive mechanism connected to said shaft;
   c) a power transmission mechanism coupled to said helical drive mechanism for driving said boat;
   wherein said helical drive mechanism comprises:
   a) a cylinder having a slot formed therethrough, said slot having a helical path along said cylinder; and b) a slider attached to said shaft, wherein said slider is arranged within said cylinder;

c) a shaft roller connected to said shaft and said slider, wherein said shaft roller contacts the portion of said cylinder forming said slot.

4. A boat comprising:

a) a shaft for receiving an input force;

b) a helical drive mechanism connected to said shaft;

c) a power transmission mechanism coupled to said helical drive mechanism for driving said boat, wherein said helical drive mechanism comprises:

a) a cylinder having a slot formed therethrough, said slot having a helical path along said cylinder; and b) a slider connected to said shaft, wherein said slider is arranged around said cylinder;

c) a shaft roller connected to said slider, wherein said shaft roller contacts the portion of said cylinder forming said helical slot.

5. A boat comprising:

a) a shaft for receiving an input force;

b) a helical drive mechanism connected to said shaft;

c) a power transmission mechanism coupled to said helical drive mechanism for driving said boat, wherein said helical drive mechanism comprises:

a) a cylinder having a slot formed therethrough, said slot having a helical path along said cylinder;

b) a slider connected to said shaft, wherein said slider is arranged around said cylinder;

c) a one-way roller clutch connected to an end of said cylinder; and d) a pinion gear attached to said one-way roller clutch;

wherein said one-way roller clutch is attached to said pinion gear by a cylindrical carrier.

6. A boat comprising:

a) a shaft for receiving an input force;

b) a helical drive mechanism connected to said shaft;

c) a power transmission mechanism coupled to said helical drive mechanism for driving said boat;

wherein said helical drive mechanism comprises:

a) a cylinder with a groove formed thereon, said groove having a helical path along said cylinder; and b) a slider attached to said shaft wherein said slider is engaged with said cylinder;

c) one-way roller clutch connected to an end of said cylinder; and d) a pinion gear attached to an end of said cylinder.

7. The boat as claimed in claim 6, wherein said power transmission mechanism comprises:

a) an output gear meshed with said pinion gear;

b) a drive line having a first end and a second end, wherein said first end of said drive line is connected to said output gear; and c) a propeller connected to said second end of said drive line.

8. The boat as claimed in claim 7, wherein said propeller is a water propeller.

9. The boat as claimed in claim 7, wherein said propeller is an air propeller.

10. A boat comprising:

a) a shaft for receiving an input force;

b) a helical drive mechanism connected to said shaft;

c) a power transmission mechanism coupled to said helical drive mechanism for driving said boat;

wherein said helical drive mechanism comprises:

a) a helical screw;

b) a slider connected to said shaft and slidably engaged with said helical screw;

c) a one-way roller clutch connected to an end of said helical screw; and d) a pinion gear connected to said one-way roller clutch;

wherein said power transmission mechanism comprises:

a) an output gear meshed with said pinion gear;

b) a drive line having a first end and a second end, wherein said first end of said drive line is connected to said output gear; and c) a propeller connected to said second end of said drive line.

11. The boat as claimed in claim 10, wherein said propeller is a water propeller.

12. The boat as claimed in claim 10, wherein said propeller is an air propeller.

13. A boat comprising:

a) a shaft for receiving an input force;

b) a helical drive mechanism connected to said shaft;

c) a power transmission mechanism coupled to said helical drive mechanism for driving said boat;

wherein said helical drive mechanism comprises:

a) a cylinder having a slot formed therethrough, said slot having a helical path along said cylinder;

b) a slider attached to said shaft wherein said slider is arranged within said cylinder;

c) path a one-way roller clutch connected to an end of said cylinder; and d) a pinion gear attached to said one-way roller clutch:

wherein said power transmission mechanism comprises;

a) an output gear meshed with said pinion gear;

b) a drive line having a first end and a second end, wherein said first end of said drive line is connected to said output gear; and c) a propeller connected to said second end of said drive line.

14. The boat as claimed in claim 13, wherein said propeller is a water propeller.

15. The boat as claimed in claim 13, wherein said propeller is an air propeller.

16. A boat comprising:

a) a shaft for receiving an input force;

b) a helical drive mechanism connected to said shaft;

c) a power transmission mechanism coupled to said helical drive mechanism for driving said boat;

wherein said helical drive mechanism comprises:

a) a cylinder having a slot formed therethrough, said slot having a helical path along said cylinder;

b) a slider connected to said shaft, wherein said slider is arranged around said cylinder;

c) a one-way roller clutch connected to an end of said cylinder; and d) a pinion gear attached to said one-way clutch;

wherein said power transmission mechanism comprises:

a) an output gear meshed with said pinion gear;

b) a drive line having a first end and a second end, wherein said first end of said drive line is connected to said output gear; and c) a propeller connected to said second end of said drive line.

17. The boat as claimed in claim 16, wherein said propeller is a water propeller.

18. The boat as claimed in claim 16, wherein said propeller is an air propeller.

19. A boat comprising:
   a) a shaft for receiving an input force;
   b) a helical drive mechanism connected to said shaft;
   c) a power transmission mechanism coupled to said helical drive mechanism for driving said boat;
   wherein said helical drive mechanism comprises:
   a) a helical screw; and
   b) a slider connected to said shaft and slidably engaged with said helical screw;
   wherein said boat further comprises:
   a) a first guide rail;
   b) a second guide rail;
   c) a seat slidably mounted on said first and second guide rails; and
   d) wherein at least a portion of said helical drive mechanism is arranged below and between said first and second guide rails.

20. The boat as claimed in claim 19, wherein said boat further comprises:
   a) a first foot pedal; and
   b) a second foot pedal.

21. A boat comprising:
   a) a shaft for receiving an input force;
   b) a helical drive mechanism connected to said shaft;
   c) a power transmission mechanism coupled to said helical drive mechanism for driving said boat;
   wherein said helical drive mechanism comprises:
   a) a cylinder having a slot formed therethrough, said slot having a helical path along said cylinder; and
   b) a slider attached to said shaft, wherein said slider is arranged within said cylinder;
   wherein said boat further comprises:
   a) a first guide rail;
   b) a second guide rail;
   c) a seat slidably mounted on said first and second guide rails; and
   d) wherein at least a portion of said helical drive mechanism is arranged below and between said first and second guide rails.

22. The boat as claimed in claim 21, wherein said boat further comprises:
   a) a first foot pedal; and
   b) a second foot pedal.

23. A boat comprising:
   a) shaft for receiving an input force;
   b) a helical drive mechanism connected to said shaft;
   c) a power transmission mechanism coupled to said helical drive mechanism for driving said boat,
   wherein said helical drive mechanism comprises:
   a) a cylinder having a slot formed therethrough, said slot having a helical path along said cylinder;
   b) a slider connected to said shaft, wherein said slider is arranged around said cylinder;
   wherein said boat further comprises:
   a) a first guide rail;
   b) a second guide rail;
   c) a seat slidably mounted on said first and second guide rails; and
   d) wherein at least a portion of said helical drive mechanism is arranged below and between said first and second guide rails.

24. The boat as claimed in claim 23, wherein said boat further comprises:
   a) a first foot pedal; and
   b) a second foot pedal.

25. A boat comprising:
   a) a shaft for receiving an input force;
   b) a helical drive mechanism connected to said shaft;
   c) a power transmission mechanism coupled to said helical drive mechanism for driving said boat;
   wherein said helical drive mechanism comprises:
   a) a cylinder with a groove formed thereon, said groove having a helical path along said cylinder; and
   b) a slider attached to said shaft, wherein said slider is engaged with said cylinder;
   wherein said boat further comprises:
   a) a first guide rail;
   b) a second guide rail;
   c) a seat slidably mounted on said first and second guide rails; and
   d) wherein at least a portion of said helical drive mechanism is arranged below and between said first and second guide rails.

26. The boat as claimed in claim 25, wherein said boat further comprises:
   a) a first foot pedal; and
   b) a second foot pedal.

27. A boat comprising:
   a) a shaft for receiving an input force;
   b) a helical drive mechanism connected to said shaft;
   c) a power transmission mechanism coupled to said helical drive mechanism for driving said boat;
   wherein said helical drive mechanism comprises:
   a) a cylinder with a groove formed thereon, said groove having a helical path along said cylinder; and
   b) a slider attached to said shaft, wherein said slider is engaged with said cylinder;
   wherein said boat further comprises:
   a) a first foot pedal; and
   b) a second foot pedal.

28. The boat as claimed in claim 27, wherein said boat further comprises:
   a) a pontoon; and
   b) a steering mechanism, wherein said steering mechanism is controlled by said first and second foot pedals.

29. The boat as claimed in claim 20, wherein said boat further comprises:
   a) a pontoon; and
   b) a steering mechanism, wherein said steering mechanism is controlled by said first and second foot pedals.

30. The boat as claimed in claim 22, wherein said boat further comprises:
   a) a pontoon; and
   b) a steering mechanism, wherein said steering mechanism is controlled by said first and second foot pedals.

31. The boat as claimed in claim 24, wherein said boat further comprises:
   a) a pontoon; and
   b) a steering mechanism, wherein said steering mechanism is controlled by said first and second foot pedals.

32. The boat as claimed in claim 26, wherein said boat further comprises
   a) a pontoon; and
   b) a steering mechanism, wherein said steering mechanism is controlled by said first and second foot pedals.

33. A boat comprising:
   a) a first shaft for receiving a first input force;
   b) a second shaft for receiving a second input force;
   c) a first helical drive mechanism connected to said first shaft;
   c) a second helical drive mechanism connected to said second shaft; and
   e) a power transmission mechanism coupled to said first and second helical drive mechanisms for driving said boat,
wherein said first helical drive mechanism comprises:
   a) a first helical screw; and
   b) a first slider connected to said first shaft and slidably engaged with said first helical screw; and
wherein said second helical drive mechanism comprises:
   a) a second helical screw; and
   b) a second slider connected to said second shaft and slidably engaged with said second helical screw.

34. The boat as claimed in claim 33, wherein a turn rate of each of said first and second helical screws is uniform.

35. The boat as claimed in claim 33, wherein a turn rate of each of said first and second helical screws varies.

36. The boat as claimed in claim 33, wherein said first slider includes:
   a) a first hole through which said first helical screw passes; and
   b) first rollers contacting said first screw; and
wherein said second slider includes:
   a) a second hole through which said second helical screw passes; and
   b) second rollers contacting said second screw.

37. A boat comprising:
   a) a first shaft for receiving a first input force;
   b) a second shaft for receiving a second input force;
   c) a first helical drive mechanism having a first helical member connected to said first shaft;
   d) a second helical drive mechanism having a second helical member connected to said second shaft; and
   e) a power transmission mechanism coupled to said first and second helical drive mechanisms for driving said boat,
wherein said first helical drive mechanism comprises:
   a) a first cylinder having a first slot formed therethrough, said first slot having a first helical path along said first cylinder; and
   b) a first slider attached to said first shaft, wherein said first slider is engaged within said first cylinder; and
wherein said second helical drive mechanism comprises:
   a) a second cylinder having a second slot formed therethrough, said second slot having a second helical path along said second cylinder; and
   b) a second slider attached to said second shaft, wherein said second slider is engaged within said second cylinder.

38. The boat as claimed in claim 37, wherein a turn rate of each of said first and second helical screws is uniform.

39. The boat as claimed in claim 37, wherein a turn rate of each of said first and second helical screws varies.

40. The boat as claimed in claim 37, wherein said first helical drive mechanism further comprises a first shaft roller connected to said first shaft and said first slider, wherein said first shaft roller contacts the portion of said first cylinder forming said first slot; and
   wherein said second helical drive mechanism further comprises a second shaft roller connected to said second shaft and said second slider, wherein said second shaft roller contacts the portion of said second cylinder forming said second slot.

41. A boat comprising:
   a) a first shaft for receiving a first input force;
   b) a second shaft for receiving a second input force;
   c) a first helical drive mechanism having a first helical member connected to said first shaft;
   d) a second helical drive mechanism having a second helical member connected to said second shaft; and
   e) a power transmission mechanism coupled to said first and second helical drive mechanisms for driving said boat,
wherein said first helical drive mechanism comprises:
   a) a first cylinder having a first slot formed therethrough, said first slot having a first helical path along said first cylinder; and
   b) a first slider connected to said first shaft, wherein said first slider is engaged around said first cylinder; and
wherein said second helical drive mechanism comprises:
   a) a second cylinder having a second slot formed therethrough, said second slot having a second helical path along said second cylinder; and
   b) a second slider connected to said second shaft, wherein said second slider is engaged around said second cylinder.

42. The boat as claimed in claim 41, wherein a turn rate of each of said first and second helical paths is uniform.

43. The boat as claimed in claim 41, wherein a turn rate of each of said first and second helical paths varies.

44. The boat as claimed in claim 41, wherein said first helical drive mechanism further comprises a first shaft roller connected to said first slider, wherein said first shaft roller contacts the portion of said first cylinder forming said first helical slot; and
   wherein said second helical drive mechanism further comprises a second shaft roller connected to said second slider, wherein said second shaft roller contacts the portion of said second cylinder forming said second helical slot.

45. A boat comprising:
   a) a first shaft for receiving a first input force;
   b) a second shaft for receiving a second input force;
   c) a first helical drive mechanism having a first helical member connected to said first shaft;
   d) a second helical drive mechanism having a second helical connected to said second shaft; and
   e) a power transmission mechanism coupled to said first and second helical drive mechanisms for driving said boat,
wherein said first helical drive mechanism comprises:
   a) a first cylinder with a first groove formed thereon, said first groove having a first helical path along said first cylinder; and
   b) a first slider connected to said first shaft, wherein said first slider is engaged with said first cylinder; and
wherein said second helical drive mechanism comprises:

a) a second cylinder with a second groove formed thereon, said second groove having a second helical path along said second cylinder; and b) a second cylinder attached to said second shaft, wherein said second slider is engaged with said second cylinder.

46. The boat as claimed in claim 45, wherein a turn rate of each of said first and second helical paths is uniform.

47. The boat as claimed in claim 45, wherein a turn rate of each of said first and second helical paths varies.

48. The boat as claimed in claim 45, wherein said first slider includes at least one spline which engages said first helical groove; and wherein said second slider includes at least one spline which engages said second helical groove.

49. The boat as claimed in claim 33, wherein said first helical drive mechanism further comprises:

a) a first one-way roller clutch connected to a first end of said first helical screw; and b) a first pinion gear connected to said first one-way roller clutch; and wherein said second helical drive mechanism further comprises:

a) a second one-way roller clutch connected to a first end of said second helical screw; and b) a second pinion gear connected to said second one-way roller clutch.

50. The boat as claimed in claim 37, wherein said first helical drive mechanism further comprises:

a) a first one-way roller clutch connected to a first end of said first cylinder; and b) a first pinion gear attached to said first one-way roller clutch; and wherein said second helical drive mechanism further comprises:

a) a second one-way roller clutch connected to a first end of said second cylinder; and b) a second pinion gear attached to said second one-way roller clutch.

51. The boat as claimed in claim 50, wherein said first one-way roller clutch is attached to said first pinion gear by a first carrier; and wherein said second one-way roller clutch is attached to said second pinion gear by a second carrier.

52. The boat as claimed in claim 41, wherein said first helical drive mechanism further comprises:

a) a first one-way roller clutch connected to a first end of said first cylinder; and b) a first pinion gear attached to said first one-way roller clutch; and wherein said second helical drive mechanism further comprises:

a) a second one-way roller clutch connected to a first end of said second cylinder; and b) a second pinion gear attached to said second one-way roller clutch.

53. The boat as claimed in claim 52, wherein said first one-way roller clutch is attached to said first pinion gear by a first carrier; and wherein said second one-way roller clutch is attached to said second pinion gear by a second carrier.

54. The boat as claimed in claim 45, wherein said first helical drive mechanism further comprises:

a) a first one-way roller clutch connected to a first end of said first cylinder; and b) a first pinion gear attached to said first one-way roller clutch; and wherein said second helical drive mechanism further comprises:

a) a second one-way roller clutch connected to a first end of said second cylinder; and b) a second pinion gear attached to said second one-way roller clutch.

55. The boat as claimed in claim 49, wherein said power transmission mechanism comprises:

a) an output gear meshed with said first and second pinion gears;

b) a drive line having a first and a second end, wherein said first end of said drive line is connected to said output gear; and c) a propeller connected to said second end of said drive line.

56. The boat as claimed in claim 50, wherein said power transmission mechanism comprises:

a) an output gear meshed with said first and second pinion gears;

b) a drive line having a first and a second end, wherein said first end of said drive line is connected to said output gear; and c) a propeller connected to said second end of said drive line.

57. The boat as claimed in claim 52, wherein said power transmission mechanism comprises:

a) an output gear meshed with said first and second pinion gears;

b) a drive line having a first and a second end, wherein said first end of said drive line is connected to said output gear; and c) a propeller connected to said second end of said drive line.

58. The boat as claimed in claim 54, wherein said power transmission mechanism comprises:

a) an output gear meshed with said first and second pinion gears;

b) a drive line having a first and a second end, wherein said first end of said drive line is connected to said output gear; and c) a propeller connected to said second end of said drive line.

59. A boat comprising:

a) a first shaft for receiving a first input force;

b) a second shaft for receiving a second input force;

c) a first helical drive mechanism having a first helical member connected to said first shaft;

d) a second helical drive mechanism having a second helical member connected to said second shaft; and e) a power transmission mechanism coupled to said first and second helical drive mechanisms for driving said boat, wherein said boat further comprises a seat, wherein said first and second helical drive mechanisms are arranged in front of and substantially below said seat.

60. The boat as claimed in claim 33, wherein said boat further comprises a seat, wherein said first and second helical drive mechanisms are arranged in front of and substantially below said seat.

61. The boat as claimed in claim 37, wherein said boat further comprises a seat, wherein said first and second helical drive mechanisms are arranged in front of and substantially below said seat.

62. The boat as claimed in claim 41, wherein said boat further comprises a seat, wherein said first and second helical drive mechanisms are arranged in front of and substantially below said seat.

63. The boat as claimed in claim 45, wherein said boat further comprises a seat, wherein said first and second helical drive mechanisms are arranged in front of and substantially below said seat.

64. The boat as claimed in claim 59, wherein said boat further comprises:
   a) a pontoon; and
   b) a steering mechanism, wherein said steering mechanism is controlled by a steering handle.

65. The boat as claimed in claim 60, wherein said boat further comprises:
   a) a pontoon; and
   b) a steering mechanism, wherein said steering mechanism is controlled by a steering handle.

66. The boat as claimed in claim 61, wherein said boat further comprises:
   a) a pontoon; and
   b) a steering mechanism, wherein said steering mechanism is controlled by a steering handle.

67. The boat as claimed in claim 62, wherein said boat further comprises:
   a) a pontoon; and
   b) a steering mechanism, wherein said steering mechanism is controlled by a steering handle.

68. The boat as claimed in claim 63, wherein said boat further comprises:
   a) a pontoon; and
   b) a steering mechanism, wherein said steering mechanism is controlled by a steering handle.

69. The boat as claimed in claim 55, wherein said propeller is a water propeller.

70. The boat as claimed in claim 56, wherein said propeller is a water propeller.

71. The boat as claimed in claim 57, wherein said propeller is a water propeller.

72. The boat as claimed in claim 58, wherein said propeller is a water propeller.

73. The boat as claimed in claim 55, wherein said propeller is an air propeller.

74. The boat as claimed in claim 56, wherein said propeller is an air propeller.

75. The boat as claimed in claim 57, wherein said propeller is an air propeller.

76. The boat as claimed in claim 58, wherein said propeller is an air propeller.

77. The boat as claimed in claim 33, wherein said boat is a submersible boat.

78. The boat as claimed in claim 37, wherein said boat is a submersible boat.

79. The boat as claimed in claim 41, wherein said boat is a submersible boat.

80. The boat as claimed in claim 45, wherein said boat is a submersible boat.

81. The boat as claimed in claim 33, wherein said boat is a hydro-foil boat.

82. The boat as claimed in claim 37, wherein said boat is a hydro-foil boat.

83. The boat as claimed in claim 41, wherein said boat is a hydro-foil boat.

84. The boat as claimed in claim 45, wherein said boat is a hydro-foil boat.

85. The boat as claimed in claim 49, further comprising:
   a) a first synchronization gear attached to a second end of said first helical screw;
   b) a second synchronization gear attached to a second end of said second helical screw; and
   c) wherein said first and second synchronization gears are meshable with one another such that when said first and second synchronization gears are meshed with one another, said first and second sliders move reciprocally in opposite directions from each other, and when said first and second synchronization gears are not meshed with one another, said first and second sliders move independently.

86. The boat as claimed in claim 50, further comprising:
   a) a first synchronization gear attached to a second end of said first cylinder;
   b) a second synchronization gear attached to a second end of said second cylinder; and
   c) wherein said first and second synchronization gears are meshable with one another such that when said first and second synchronization gears are meshed with one another, said first and second sliders move reciprocally in opposite directions from each other, and when said first and second synchronization gears are not meshed with one another, said first and second sliders move independently.

87. The boat as claimed in claim 52, further comprising:
   a) a first synchronization gear attached to a second end of said first cylinder;
   b) a second synchronization gear attached to a second end of said second cylinder; and
   c) wherein said first and second synchronization gears are meshable with one another such that when said first and second synchronization gears are meshed with one another, said first and second sliders move reciprocally in opposite directions from each other, and when said first and second synchronization gears are not meshed with one another, said first and second sliders move independently.

88. The boat as claimed in claim 54, further comprising:
   a) a first synchronization gear attached to a second end of said first cylinder;
   b) a second synchronization gear attached to a second end of said second cylinder; and
   c) wherein said first and second synchronization gears are meshable with one another such that when said first and second synchronization gears are meshed with one another, said first and second sliders move reciprocally in opposite directions from each other, and when said first and second synchronization gears are not meshed with one another, said first and second sliders move independently.

89. The boat as claimed in claim 85, further comprising:
   a) a cable attached to said first synchronization gear; and
   b) a handle connected to said cable, wherein said handle controls whether said first and second synchronization gears are meshed with one another.

90. The boat as claimed in claim 86, further comprising:
   a) a cable attached to said first synchronization gear; and
   b) a handle connected to said cable, wherein said handle controls whether said first and second synchronization gears are meshed with one another.

91. The boat as claimed in claim 87, further comprising:
   a) a cable attached to said first synchronization gear; and b) a handle connected to said cable, wherein said handle controls whether said first and second synchronization gears are meshed with one another.

92. The boat as claimed in claim 88, further comprising:

a) a cable attached to said first synchronization gear; and b) a handle connected to said cable, wherein said handle controls whether said first and second synchronization gears are meshed with one another.

* * * * *